(12) United States Patent
Schultz, Jr. et al.

(10) Patent No.: US 11,879,574 B1
(45) Date of Patent: *Jan. 23, 2024

(54) SEALING ASSEMBLY WITH IMPROVED GASKET

(71) Applicant: Trane International Inc., Davidson, NC (US)

(72) Inventors: Gary L. Schultz, Jr., Bullard, TX (US); Travis Hansen, Holland, MI (US)

(73) Assignee: Trane International Inc., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,708

(22) Filed: Nov. 8, 2022

Related U.S. Application Data

(63) Continuation of application No. 17/138,564, filed on Dec. 30, 2020, now Pat. No. 11,585,472.

(51) Int. Cl.
| | |
|---|---|
| *F16L 21/00* | (2006.01) |
| *F24D 19/10* | (2006.01) |
| *F24H 3/06* | (2022.01) |

(52) U.S. Cl.
CPC ........ *F16L 21/005* (2013.01); *F24D 19/1084* (2013.01); *F24H 3/06* (2013.01)

(58) Field of Classification Search
CPC . F16L 21/00; F16L 21/02; F16L 21/03; F16L 21/05; F16L 25/02; F16L 25/025; F16L 25/04; F16L 25/08; F16L 33/08; F16L 33/085; F16L 33/10; F16L 33/06; F16L 33/04; F16L 33/18; F16L 33/20; F16L 33/207; F16L 33/2071; F16L 33/2073; F16L 35/00; F16L 49/00; F16L 49/02; F16L 57/00; F16L 58/00; F16L 58/185
See application file for complete search history.

(56) References Cited

U.S. PATENT DOCUMENTS

| | | |
|---|---|---|
| 2,196,622 A | 9/1940 | Bean |
| 2,559,210 A | 11/1946 | Bradley |
| 4,215,883 A | 8/1980 | Brown, Sr. |

(Continued)

FOREIGN PATENT DOCUMENTS

| | | | |
|---|---|---|---|
| GB | 698268 A | 10/1953 | |
| JP | 2010174946 | * 8/2010 | .............. F16L 37/12 |

OTHER PUBLICATIONS

Translation JP2010-174946 (Year: 2010).*

*Primary Examiner* — Aaron M Dunwoody
(74) *Attorney, Agent, or Firm* — WOMBLE BOND DICKINSON (US) LLP

(57) ABSTRACT

Example embodiments of the present disclosure relate to a sealing apparatus including a gasket for use in connecting HVAC fluid conduits. In one embodiment, the gasket includes a tubular body, a rim extending outwardly from an end of the tubular body, and two or more ears extending from the rim. The tubular body may be configured to engage a fluid conduit. Each of the ears may be spaced apart from the tubular body and extend in substantially the same direction as the tubular body. Each of the ears may further include an inner surface for engaging with a fluid conduit and an outer surface for engaging with a pipe clamp. The ears may further include a rib located proximate a distal end of the ear.

19 Claims, 18 Drawing Sheets

(56) References Cited

U.S. PATENT DOCUMENTS

| | | | |
|---|---|---|---|
| 4,611,835 | A | 9/1986 | Gittleman |
| 5,622,391 | A | 4/1997 | Belik |
| 6,231,090 | B1 | 5/2001 | Fukao et al. |
| 6,905,145 | B2 | 6/2005 | Krauss et al. |
| 7,114,752 | B2 | 10/2006 | Voelker |
| 10,036,493 | B2 | 7/2018 | Vandal et al. |
| 11,585,472 | B2 * | 2/2023 | Shultz, Jr. ................. F24H 3/06 |
| 2004/0080154 | A1 | 4/2004 | Krauss et al. |
| 2007/0173110 | A1 | 7/2007 | Heberer et al. |
| 2015/0247508 | A1 | 9/2015 | Lyons |
| 2019/0323518 | A1 | 10/2019 | Lyons |
| 2020/0292109 | A1 | 9/2020 | Quesada |

* cited by examiner

SEALING ASSEMBLY WITH IMPROVED GASKET

CROSS-REFERENCE TO RELATED APPLICATIONS

This application is a continuation of application Ser. No. 17/138,564 filed Dec. 30, 2020. The aforementioned patent application is hereby incorporated by reference in its entirety.

TECHNOLOGICAL FIELD

The present disclosure relates generally to an improved sealing assembly utilizing a gasket for use in joining fluid conduits, potentially conduits for use in an HVAC device.

BACKGROUND

Various sealing assemblies for joining conduit pipes exist, and many of these assemblies utilize gasket designs. These designs often focus on providing a seal at one or more locations while securing pipes together. However, problems exist with these designs, particularly in the unsealed configuration. For example, gaskets may only be designed to mate with a particular area or surface requiring sealing, and as a result, they may be loosely or awkwardly configured in a given sealing assembly prior to installation.

This issue is prevalent in sealing assemblies used in HVAC devices, particularly exhaust assemblies for gas-fired furnaces that utilize a male to female pipe connection. In these designs, a gasket may only be loosely arranged within a given pipe prior to installation, and the gasket may become dislodged and/or lost during shipping. In addition, these assemblies are typically coupled and uncoupled at least once prior to final installation. This often results in the male pipe pushing the gasket into the female pipe causing further challenges, and potentially, if not identified, significant harm to the operation of the underlying HVAC system.

As a result, there exists a need for an improved sealing assembly, which is able to accomplish the significant sealing requirements of a complex joint, while also allowing for efficient packaging and transportation in an uninstalled configuration. The sealing assembly should also be able to be coupled and uncoupled prior to final installation with a decreased risk of being dislodged.

BRIEF SUMMARY

The present disclosure relates to a sealing assembly designed to overcome one or more of these existing issues. This assembly utilizes an improved gasket configured to interact with a fluid conduit and/or a pipe clamp to address these deficiencies in the prior art.

The present disclosure thus includes, without limitation, the following example implementations.

Some example implementations provide a sealing apparatus, comprising: a fluid conduit comprising a first fluid conduit end and a second fluid conduit end; a gasket engaged with the first fluid conduit end, the gasket comprising: a tubular body, at least a portion of which is engaged along an inner surface of the fluid conduit; a rim extending outwardly from a first tubular body end, wherein a portion of the rim abuts the first fluid conduit end; and two or more ears extending from the rim in the same direction as the tubular body and spaced therefrom; wherein each of the ears further comprises a first rib located proximate a distal end of the ear; and a pipe clamp engaged with an outer surface of the ears to secure the gasket to the fluid conduit.

In some example implementations of the sealing apparatus of any example implementation, or any combination of any preceding example implementation, the fluid conduit is an exhaust conduit configured to be used in a furnace.

In some example implementations of the sealing apparatus of any example implementation, or any combination of any preceding example implementation, the exhaust conduit is coupled to an inducer blower within the furnace.

In some example implementations of the sealing apparatus of any example implementation, or any combination of any preceding example implementation, the rim extends substantially perpendicularly outwardly from the tubular body, the ears extend substantially perpendicularly from the rim and substantially parallel to the tubular body, and the first rib of each ear extends substantially perpendicularly outwardly from the ear.

In some example implementations of the sealing apparatus of any example implementation, or any combination of any preceding example implementation, the ears extend substantially the same distance from the rim as the tubular body.

In some example implementations of the sealing apparatus of any example implementation, or any combination of any preceding example implementation, the ears are tapered such that the width of each ear continuously narrows from the rim to the distal end of the ear.

In some example implementations of the sealing apparatus of any example implementation, or any combination of any preceding example implementation, the tubular body comprises an inner lip extending inwardly from a second tubular body end of the tubular body.

In some example implementations of the sealing apparatus of any example implementation, or any combination of any preceding example implementation, the gasket comprises a deformable elastic material rated for temperatures at least as great as 135° C.

Some example implementations provide a furnace, comprising: a burner, a heat exchanger, a blower configured to move combustion air through the heat exchanger; and an exhaust assembly in fluid communication with, and downstream of, the blower, the exhaust assembly comprising: a flue pipe comprising a flue pipe inlet end and a flue pipe outlet end; an exhaust conduit comprising an exhaust conduit inlet end and an exhaust conduit outlet end, the exhaust conduit formed from a substantially rigid material suitable for supporting the weight of the flue pipe; a gasket engaged proximate to the exhaust conduit outlet end of the exhaust conduit and configured to form a seal between the exhaust conduit and the flue pipe, and a pipe clamp configured to secure the exhaust conduit around the flue pipe, wherein the gasket further comprises: a tubular body, wherein at least a portion of the tubular body is engaged with an inner surface of the exhaust conduit and a portion of the tubular body is engaged with an outer surface of the flue pipe; a rim extending outwardly from a first tubular body end, wherein a portion of the rim surface abuts the exhaust conduit outlet end; and two or more ears extending from the rim along an outer surface of the exhaust conduit, wherein each of the ears further comprises a first rib located proximate a distal end of the ear; and wherein the pipe clamp is engaged with an outer surface of the ears to secure the gasket to the exhaust conduit.

In some example implementations of the furnace of any example implementation, or any combination of any preceding example implementation, an inner surface of the tubular body comprises an inner lip extending inwardly from a second tubular body end of the tubular body.

In some example implementations of the furnace of any example implementation, or any combination of any preceding example implementation, the rim extends substantially perpendicularly outwardly from the tubular body, the ears extend substantially perpendicularly from the rim and substantially parallel to the tubular body, and the first rib of each ear extends substantially perpendicularly outwardly from the ear.

In some example implementations of the furnace of any example implementation, or any combination of any preceding example implementation, the ears extend substantially the same distance from the rim as the tubular body.

In some example implementations of the furnace of any example implementation, or any combination of any preceding example implementation, the ears are tapered such that the width of each ear continuously narrows from the rim to the distal end of the ear.

In some example implementations of the furnace of any example implementation, or any combination of any preceding example implementation, the pipe clamp applies a first force to retain the gasket on the exhaust conduit and the pipe clamp applies a second force to maintain the seal between exhaust conduit and the flue pipe, the second force being greater than the first force.

In some example implementations of the furnace of any example implementation, or any combination of any preceding example implementation, the pipe clamp comprises a visual indictor that provides an indication of the force applied by the pipe clamp.

In some example implementations of the furnace of any example implementation, or any combination of any preceding example implementation, the exhaust conduit further comprises: a first conduit protrusion extending from the outer surface of the exhaust conduit, wherein the first conduit protrusion is located a first distance from the exhaust conduit outlet end, and wherein the ears extend a second distance from the rim and the second distance is equal to or greater than the first distance, and wherein at least one ear is engaged with the first conduit protrusion.

In some example implementations of the furnace of any example implementation, or any combination of any preceding example implementation, the first conduit protrusion extends circumferentially around the outer surface of the fluid conduit.

In some example implementations of the furnace of any example implementation, or any combination of any preceding example implementation, further comprising a second conduit protrusion extending from the outer surface of the fluid conduit and aligned axially with the first conduit protrusion, wherein the second conduit protrusion is located proximate to the exhaust conduit outlet end.

Some example implementations provide a gasket for use in an HVAC fluid conduit comprising: a tubular body, at least a portion of which is configured to be engaged along an inner surface of the fluid conduit; a rim extending outwardly from a tubular body end; and two or more ears extending from the rim in the same direction as the tubular body and spaced therefrom, wherein each of the ears further comprises a first rib located proximate a distal end of the ear.

In some example implementations of the gasket of any example implementation, or any combination of any preceding example implementation, the rim extends substantially perpendicularly outwardly from the extended inner ring, the ears extend substantially perpendicularly from the rim and substantially parallel to the tubular body, and the first rib of each ear extends substantially perpendicularly outwardly from the ear.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE FIGURE(S)

In order to assist the understanding of aspects of the disclosure, reference will now be made to the appended drawings, which are not necessarily drawn to scale. The drawings are provided by way of example to assist in the understanding of aspects of the disclosure, and should not be construed as limiting the disclosure.

DETAILED DESCRIPTION

Figure 1:
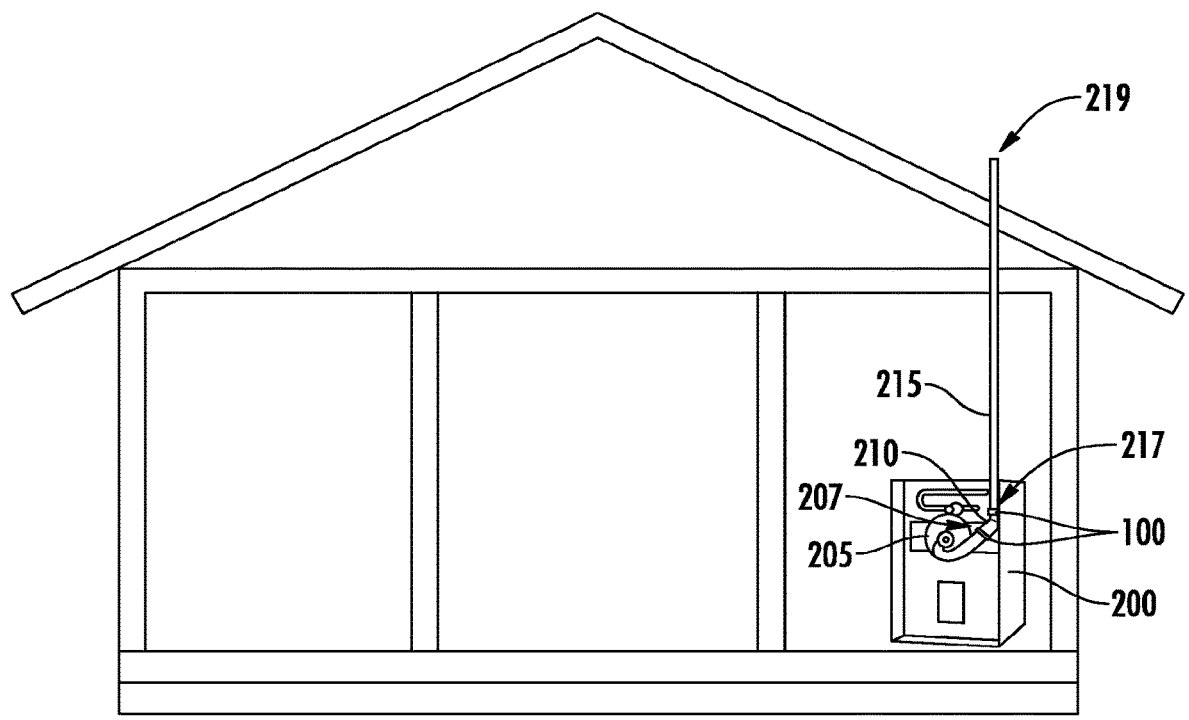
FIG. 1 is a schematic of a furnace utilizing a sealing assembly, the furnace located in a structure, according to an example embodiment of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

For example, unless specified otherwise or clear from context, references to first, second or the like should not be construed to imply a particular order. A feature described as being above another feature (unless specified otherwise or clear from context) may instead be below, and vice versa; and similarly, features described as being to the left of another feature may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise, or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout.

As used herein, the terms "bottom," "top," "upper," "lower," "upward," "downward," "rightward," "leftward," "interior," "exterior," and/or similar terms are used for ease of explanation and refer generally to the position of certain components or portions of the components of embodiments of the described disclosure in the installed configuration (e.g., in an operational configuration, such as located in a fluid conduit and/or HVAC devices). It is understood that such terms are not used in any absolute sense.

Example implementations of the present disclosure relate generally to an improved gasket and sealing joint design for use with a fluid conduit, potentially a fluid conduit used in an HVAC device. Example implementations will be primarily described in conjunction with furnaces used in HVAC applications, but it should be understood that example implementations may be utilized in conjunction with a variety of other applications. For example, other HVAC devices include but are not limited to indoor units, outdoor units, heaters (electric or otherwise), boilers as well as other devices generally including water heaters, kitchen appliances, and the like may utilize the assembly described herein.

Example embodiments of the present disclosure relate to a sealing assembly capable of sealing a fluid conduit joint as well as the inventive components of this assembly. This assembly may include an improved gasket with additional features such as ears, ribs, and/or rims. The assembly may further include a pipe clamp. In addition, in some embodiments, the assembly may also utilize various features associated with one or more of the fluid conduits being joined. Each of these components are described in more detail below.

Figure 2:
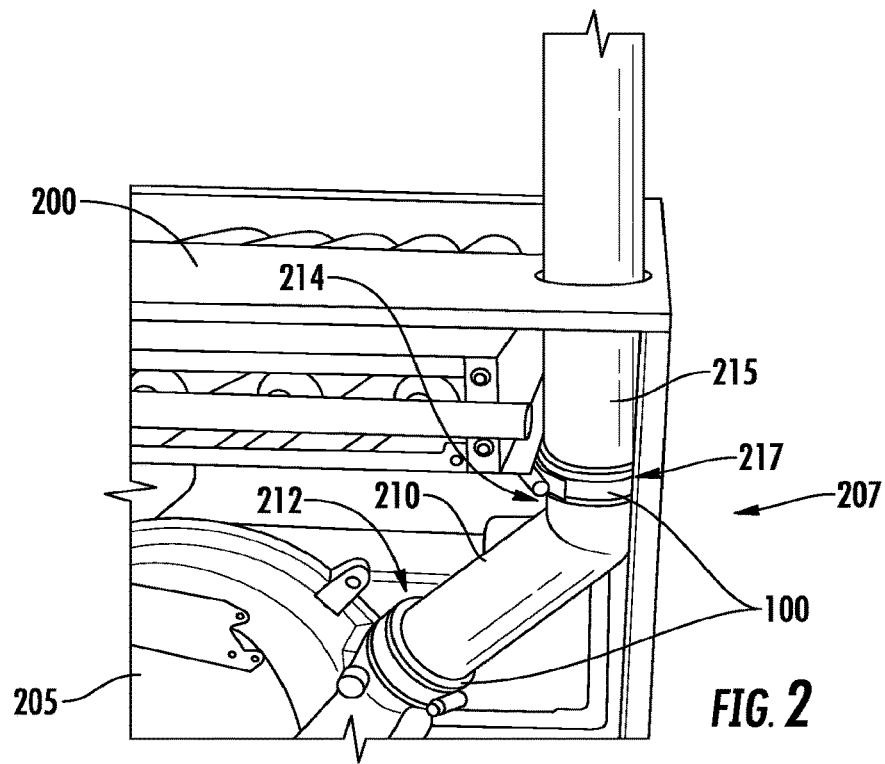
FIG. 2 is a close-up schematic of a furnace utilizing a sealing assembly, according to an example embodiment of the present disclosure.

FIGS. 1 and 2 show example embodiments of the present assembly being utilized in a furnace 200. FIG. 1 shows a sealing assembly 100 utilized in a furnace 200 located within a structure, such as a residence. FIG. 2 shows a close up of two sealing assemblies 100 located within the furnace 200. Although in both of these figures two sealing assemblies 100 are shown, in other embodiments any number of sealing assemblies may be used, including as few as one sealing assembly. Furnace 100 may include an exhaust assembly 207 that directs combustion air from furnace 200 to a given location. In the depicted embodiments, the furnace 100 includes an exhaust assembly 207 that includes one sealing assembly 100 connecting a draft inducer 205 to an exhaust conduit 210 within the furnace 200, and another sealing assembly 100 that connects the exhaust conduit 210 to a flue pipe 215. In other embodiments, the exhaust assembly may include more or less components than those shown in FIGS. 1 and 2. In the depicted embodiments, the exhaust conduit 210 includes an exhaust conduit inlet end 212 and an exhaust conduit outlet end 214. In the depicted embodiments, one sealing assembly 100 connects the draft inducer 205 to the exhaust conduit inlet end 212. The other sealing assembly 100 connects the exhaust conduit outlet end 214 to the flue pipe 215 at the flue pipe inlet end 217. FIG. 1 shows the flue pipe 215 extending through the roof and terminating outside the structure, and in this embodiment, the flue pipe outlet end 219 directs the combustion air to the outside.

Figure 3:
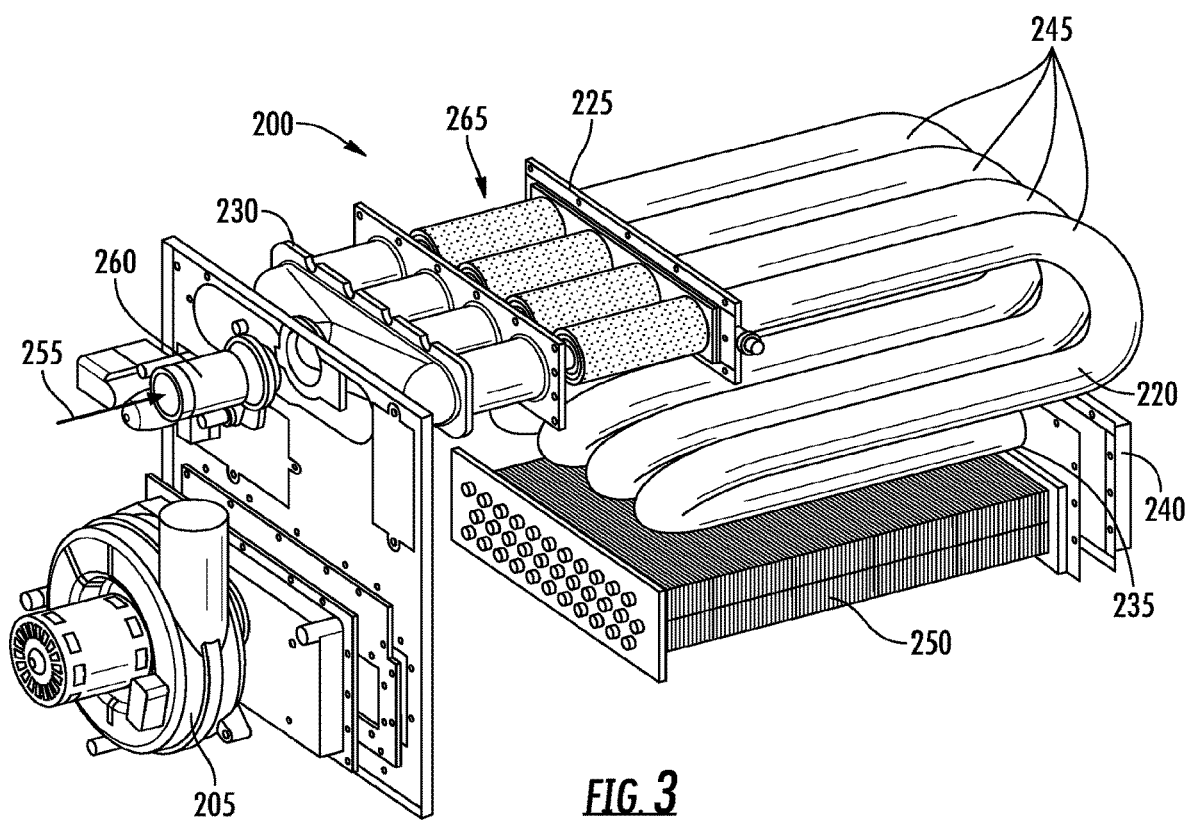
FIG. 3 is a schematic of various components of a furnace, according to an example embodiment of the present disclosure.
Figure 4:
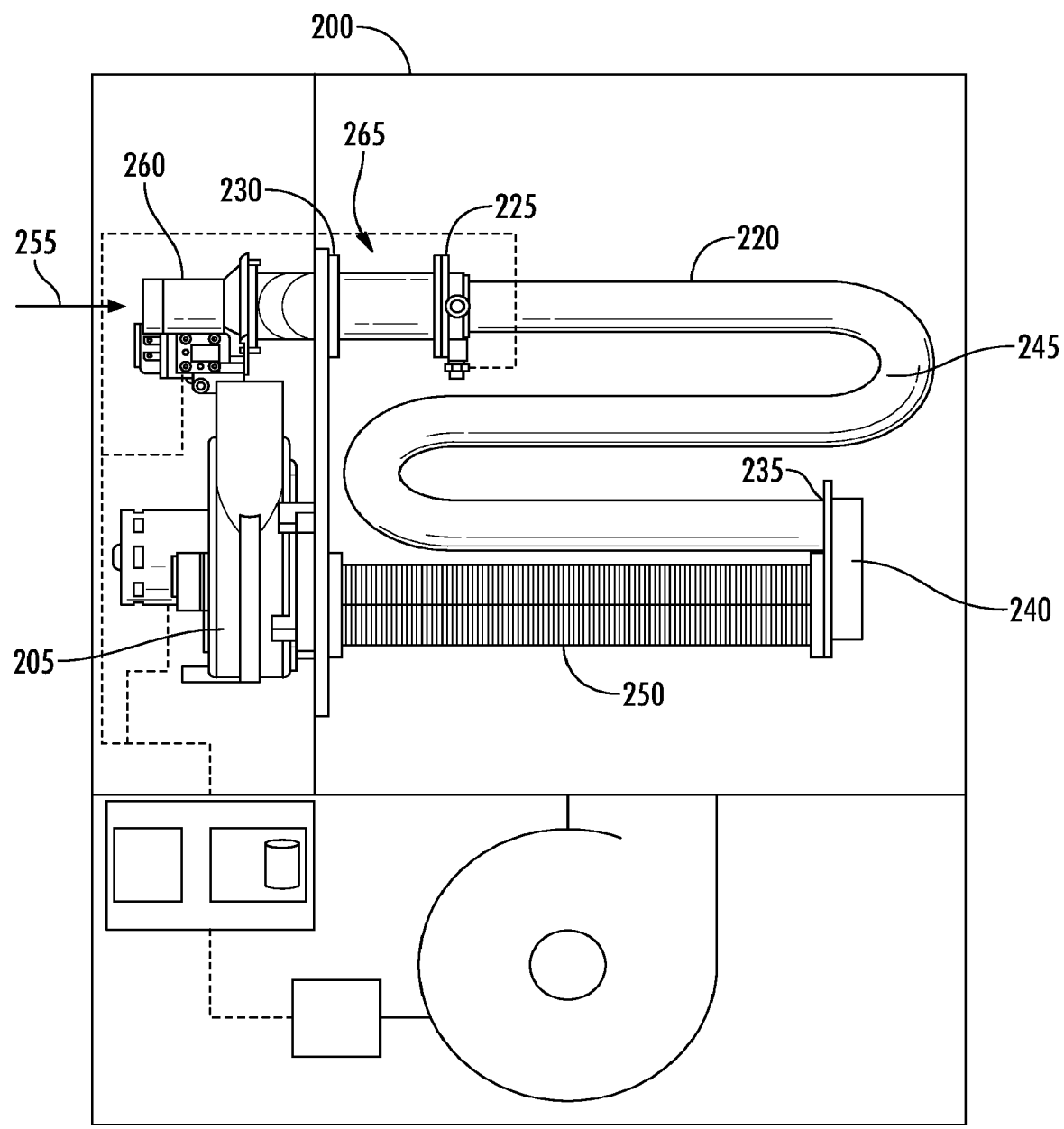
FIG. 4 is a schematic of various components of a furnace, according to an example embodiment of the present disclosure.

Referring now to FIGS. 3 and 4, embodiments of a gas-fired furnace 200 are shown that may utilize the sealing assembly disclosed in the present application. As discussed herein, a furnace (e.g., furnace 200) may be referred to as being "gas-fired", where the "gas-fired" furnace is configured to be in fluid communication with a gas supply for thermodynamic heat transfer. In some embodiments, furnace 200 may comprise components of an HVAC system that includes an indoor unit comprising furnace 200 and an indoor refrigerant heat exchanger or evaporator, an outdoor unit comprising an outdoor fan and an outdoor refrigerant heat exchanger or condenser, and a refrigerant loop extending between the indoor and outdoor refrigerant heat exchangers. Furnace 200 may be configured as an indoor furnace that provides conditioned fluid, often air, to a comfort zone of an indoor space. However, in general, the components of furnace 200 may be equally employed in an outdoor or weatherized furnace to condition an interior space. Moreover, furnace 200 may be used in residential or commercial applications.

In the embodiments depicted in FIGS. 3 and 4, furnace 200 includes a heat exchanger 220 that has a first heat exchanger end 225 coupled to intake manifold 230 and a second heat exchanger end 235 coupled to hot collector box 240. Heat exchanger 220 may comprise a plurality of heat exchanger tubes 245. In some embodiments, a finned condensing heat exchanger 250 may extend from the hot collector box 240 to the draft inducer 205. However, generally, furnace 200 may be operated with or without a condensing heat exchanger as a "condensing" or "non-condensing" furnace, respectively.

In the embodiments shown in FIGS. 3 and 4, the combustion air flow follows a combustion air flow path (indicated by arrow 255) that may be in a direction beginning at the air/fuel mixing unit 260, extending through various components to the draft inducer 205. The combustion air flow path 255 continues to an exhaust conduit 210 (shown in FIGS. 1 and 2) that may connect with a flue pipe 215 (shown in FIGS. 1 and 2) using the sealing assembly 100 (shown in FIGS. 1 and 2).

In some embodiments, the combustion air flow described above may be introduced into furnace 200 by a blower. This blower may be a draft inducer (as shown in FIGS. 3 and 4) when the blower is operating in an induced draft mode and pulling the combustion air flow through furnace 200 (as shown in FIGS. 3 and 4), or the blower may be a forced draft blower when the blower is operating in a forced draft mode and pushing the combustion air flow through furnace 200. In the depicted embodiments, the draft inducer 205 is in fluid communication with combustion air flow path 255 and is down-stream of heat exchanger 220. Embodiments using a forced draft mode may be accomplished by placing a blower at the inlet of air/fuel mixing unit 260 and forcing the gas flow into and through air/fuel mixing unit 260 and along combustion air flow path 255.

As described above, an HVAC system including an indoor unit and an outdoor unit may include furnace 200 as a component of the indoor unit thereof or as a separate and distinct unit in the HVAC system.

Figure 5A:
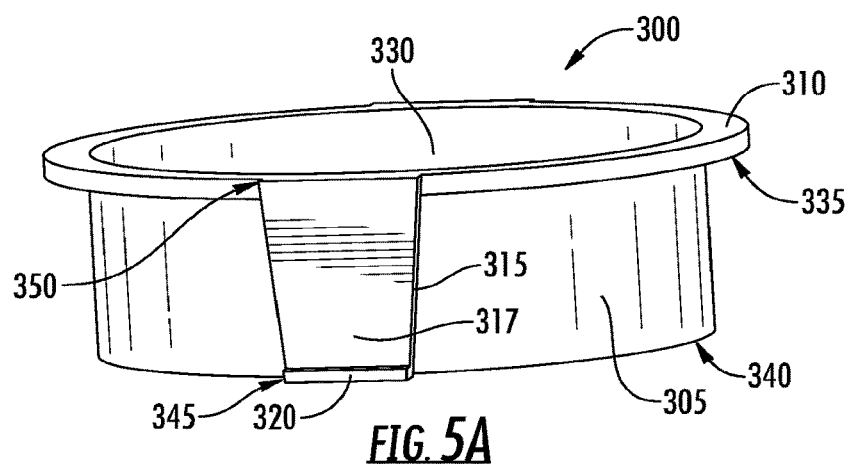
FIG. 5A is a side illustration of a gasket, according to an example embodiment of the present disclosure.
Figure 5B:
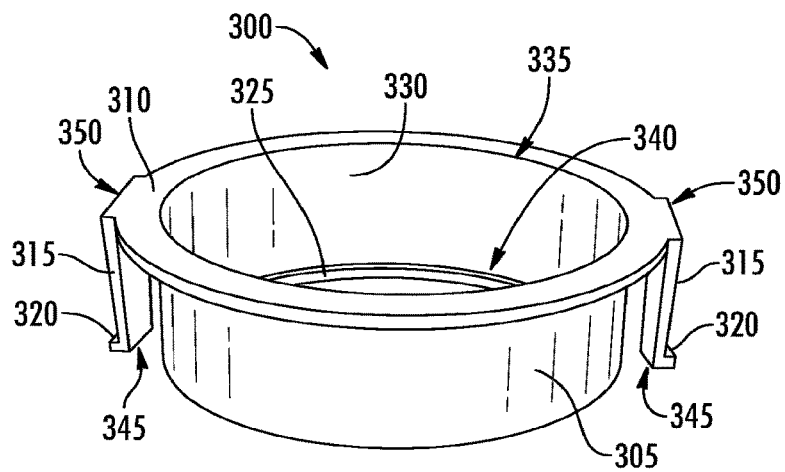
FIG. 5B is an illustration of a gasket from another angle, according to an example embodiment of the present disclosure.
Figure 5C:
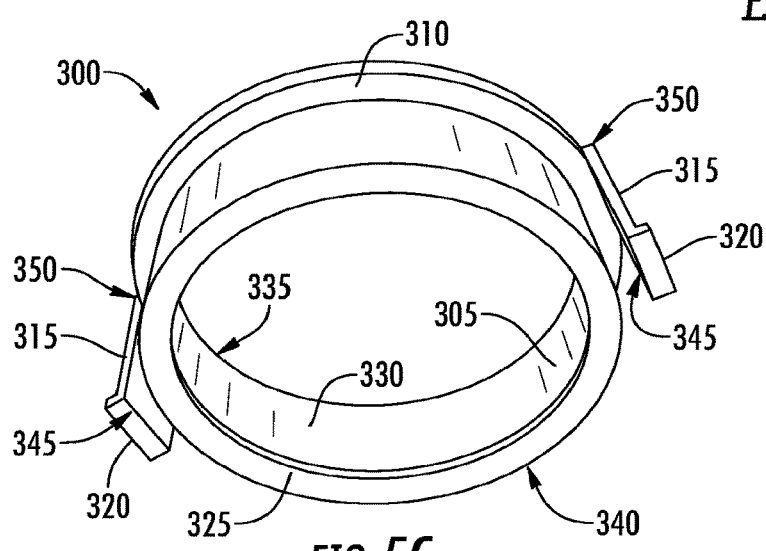
FIG. 5C is an illustration of a gasket from another angle, according to an example embodiment of the present disclosure.

FIGS. 5A, 5B, and 5C show example embodiments of the gasket 300 which may be utilized in the sealing assembly 100. In the depicted embodiments, the gasket 300 comprises a tubular body 305. A rim 310 extends radially outward from the tubular body 305. The gasket 300 also has ears 315 that extend from the rim 310. These ears 315 are connected to the rim a radial distance away from the tubular body 305. The embodiments shown in FIGS. 5A-C further include a rib 320 extending from each ear 315. In addition, the depicted embodiments also include an inner lip 325 extending from an inner surface 330 of the tubular body 305.

The embodiments depicted in FIGS. 5A, 5B, and 5C show one example of how these components are oriented relative to each other. In the embodiments shown, the rim 310 extends substantially perpendicularly from the tubular body 305. Each ear 315 extends from the rim 310 substantially perpendicularly and in the same direction as the tubular body 305. Each ear 315 also is attached to the rim 310 a distance away from where the tubular body 305 attaches to the rim 310. In the embodiments shown, the ribs 320 extend substantially perpendicularly from each ear 315. The inner lip 325 also extends substantially perpendicularly and inwardly from the tubular body 305. In other embodiments, the tubular body may connect to the rim at an angle. In such embodiments, for example, the tubular body may flare outward (e.g., forming an angle less than 90° with respect to the rim) or inward (e.g., forming an angle greater than 90° with respect to the rim) for a given application or joint. In some embodiments, one or more ears may extend from the rim at an angle in a similar fashion. For example, in some embodiments one or more of the ears may flare outward (e.g., forming an angle greater than 90° with respect to the tubular body) or inward (e.g., forming an angle less than 90° with respect to the tubular body). The rib(s) and/or the inner lip may also extend in various ways. Similarly, the tubular body may extend past the rim. Other configurations and orientations for these components are contemplated within the scope of the disclosure.

To walk through these components in more detail, the tubular body 305 may be configured to engage the inner surface of a fluid conduit. In some embodiments, this tubular body is used to form a seal between a male and female fluid conduit pipe. In the embodiments shown in FIGS. 5A-C, the tubular body 305 is cylindrical in shape and includes a constant thickness running the length of the tubular body 305. The tubular body 305 also comprises a first tubular body end 335 and a second tubular body end 340. Other configurations and orientations (e.g., rectangular, frustro-conical, varying thickness, etc.) for the tubular body are contemplated within the scope of this disclosure.

In the embodiments shown in FIGS. 5A-C, the rim 310 extends radially from the first tubular body end 335 of the tubular body 305. In some embodiments, the rim is designed to extend from the tubular body 305 at a location past the end of a fluid conduit. In some embodiments, the tubular body may be located within the fluid conduit and the rim may extend from the tubular body outward from the fluid conduit, past an outer surface of the fluid conduit. In the embodiments shown in FIGS. 5A-C, the rim 310 has a continuous disk shape. In some embodiments, the rim may only extend from a portion of the upper end of the tubular body. In some embodiments, the rim may vary in length, for example, the rim may include projections where the rim extends outward a greater or lesser distance from the tubular body. Other configurations and orientations for the rim are contemplated within the scope of the disclosure.

In the embodiments shown in FIGS. 5A-C, the gasket 300 further includes ears 315 extending from the rim 310. In these embodiments, the gasket 300 includes two ears 315, which are evenly spaced around the rim 310. Other embodiments may include more than two ears. In some embodiments, these ears may be spaced equidistant around the rim and/or the tubular body. In other embodiments, the spacing of the ears may vary, including spacing that is not equidistant. In still other embodiments, a single ear may be used.

In the embodiments shown in FIGS. 5A-C, the ears 315 extend the same direction from the rim 310 as the tubular body 305. In these embodiments, the ears 315 are spaced a distance apart from the tubular body 305 radially on the rim. In the depicted embodiments, the ears 315 extend substantially parallel to the tubular body 305. As noted, however, in other embodiments, the ears extend at an angle, either towards or away, from the tubular body. In the depicted embodiments, the ears 315 extend the same distance from the rim 310 as the tubular body 305. In other embodiments, however, the ears may extend a greater or lesser distance from the rim than the length of the tubular body.

FIG. 5A shows an embodiment where the ears 315 are tapered. In the depicted embodiment, the ear 315 is shaped such that the width continuously narrows from the rim 310 to the distal end 345. In particular, in the depicted embodiment, the width of the ear 315 at the proximal end 350 is the widest portion of the ear 315, and the width decreases from the proximal end 350 to the distal end 345 of the ear 315. In another embodiment, the width of the ear may consistently widen from the proximal end to the distal end. In other embodiments, the ears may remain at a substantially constant width for some or all of their length.

In one embodiment, the ears 315 include ribs 320. In the embodiments shown in FIGS. 5A-C, the ribs 320 extend outwardly from the distal end 345 of the ear 315. In the depicted embodiments, each ear 315 includes a rib 320. In some embodiments, the rib may be located a distance away from the distal end of the ear, and in some embodiments, a rib may only be included on certain ears. In further embodiments, two or more ribs may be included on one or more of the ears. In some of these embodiments, one of the ribs may be located on the distal end of an ear and at least one other rib may be located a distance away from the distal end. Other configurations and orientations of ribs and ears are contemplated within the scope of the disclosure.

In some embodiments, such as the ones shown in FIGS. 5A-C, the gasket 300 includes an inner lip 325. In the depicted embodiments, the inner lip 325 extends inwardly from the tubular body 305. In the depicted embodiments, the inner lip 325 extends from the second tubular body end 340 of tubular body 305. In other embodiments, the inner lip may extend from other locations on tubular body. In some embodiments, the inner lip is configured to engage with the lower end of a male fluid conduit.

In some embodiments, the gasket 300 is made from an elastic material. In some embodiments the gasket 300 is made from a deformable elastic (e.g., thermoplastic vulcanizate) material rated for temperatures at least as great as 135° C.

FIGS. 10A-G show various views of an embodiment of a gasket, according to an example embodiment of the present disclosure. FIGS. 11A-G show various views of another gasket embodiment, according to an example embodiment of the present disclosure. The embodiments depicted in FIGS. 11A-G include a beveled edge 355 connecting the tubular body 305 to the rim 310. The embodiments of the gaskets depicted in FIGS. 10A-G and FIGS. 11A-G may include many of the features discussed above and may be configured in a similar manner.

Figure 6:
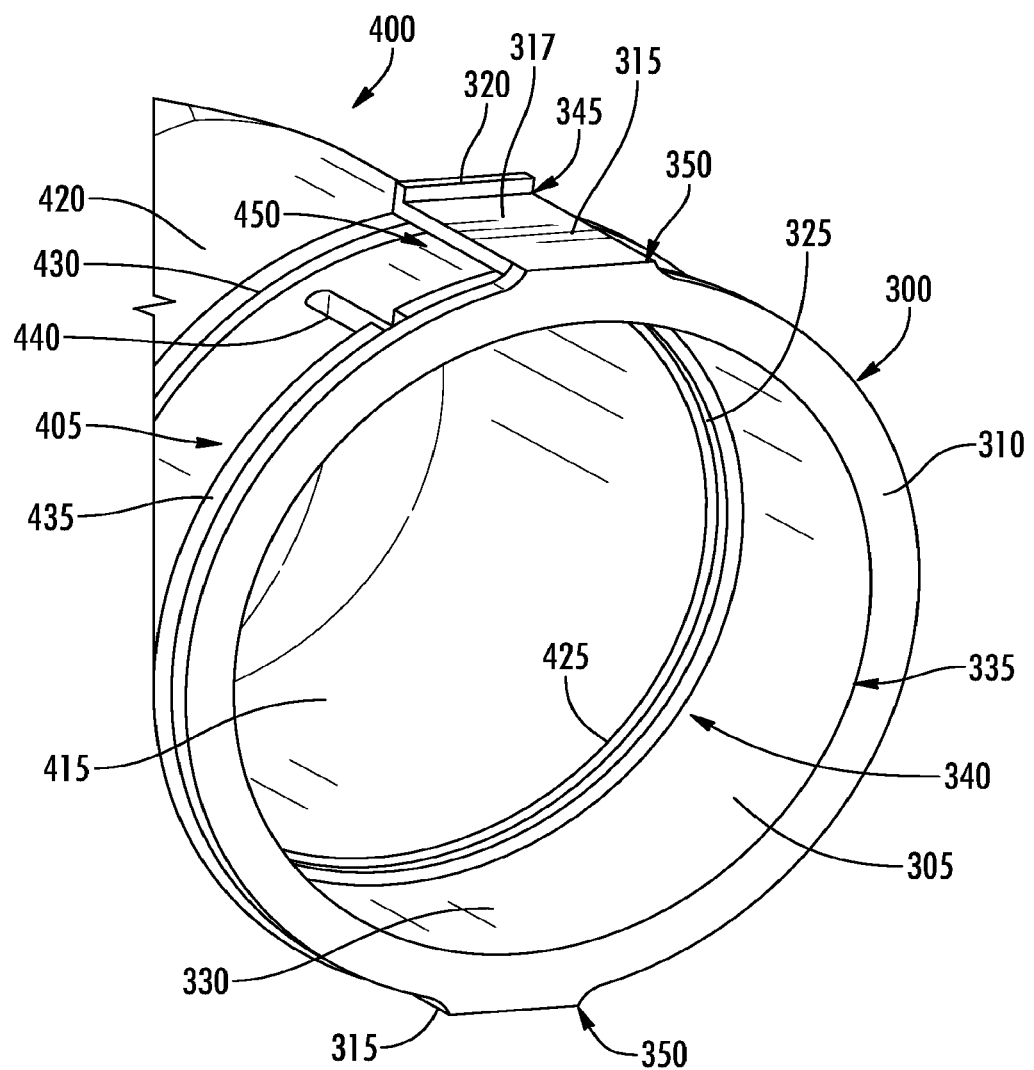
FIG. 6 is an illustration of a gasket within a fluid conduit, according to an example embodiment of the present disclosure.

FIG. 6 shows an example embodiment of the gasket 300 engaged with a fluid conduit 400. The fluid conduit 400 may include a first fluid conduit end 405, potentially a fluid conduit outlet end, and a second fluid conduit end 410, potentially a fluid conduit inlet end (not shown). The conduit may further include an inner surface 415 and an outer surface 420. The inner surface 415 of the fluid conduit 400 may include a wall shelf 425. The outer surface 420 may also include additional features. These features may include a first conduit protrusion 430 extending from the outer surface 420 and located a distance away from the first fluid conduit end 405. Some embodiments, such as the embodiment depicted in FIG. 6, may also include a second conduit protrusion 435 that may be located proximal to the first fluid conduit end 405. The depicted embodiment also includes one or more axial slots 440 that may extend from the first fluid conduit end 405. These slots 440 may allow the diameter of the first fluid conduit end 405 of the fluid conduit 400 to adjust, potentially allowing the fluid conduit 400 to engage and potentially form a seal with other components and/or conduits.

The fluid conduit 400 may be a rigid pipe or other device made of a suitable material and capable of directing fluid. In some embodiments, the fluid conduit 400, such as exhaust conduit 210, is made from a material having suitable strength to support other components, such as a flue pipe 215 as shown in FIG. 1. In some embodiments, the fluid is air, potentially used in an HVAC application. In other embodiments, the fluid is a liquid, potentially water or a refrigerant. In some embodiments, such as the embodiments shown in FIGS. 1 and 2, the fluid conduit 400 may be an elbow joint that forms an exhaust conduit 210 used in a furnace exhaust assembly. In these embodiments, the fluid is combustion air discharged from a gas-fired furnace 200. Other fluid conduits are contemplated within the scope of this disclosure.

In some embodiments, such as the one shown in FIG. 6 (and FIGS. 8A and 8B), the fluid conduit 400 includes a wall shelf 425, which is formed where the diameter of the inner surface 415 of the fluid conduit 400 changes. In these embodiments, the diameter of the inner surface 415 of the fluid conduit 400 narrows to create the wall shelf 425. Here the diameter of the inner surface 415 proximal the first fluid conduit end 405 before the shelf 425 is greater than the diameter of the inner surface 415 at or distal to the shelf 425 relative to the first fluid conduit end 405. Some embodiments may include an inner wall lip, where the inner surface maintains a consistent circumference on either side of the wall lip. Some embodiments do not include either a wall shelf or an inner wall lip.

The embodiment shown in FIG. 6 also includes conduit protrusions. The depicted embodiment shows a first conduit protrusion 430 extending radially from the outer surface 420 and located an axial distance away from the first fluid conduit end 405. In the depicted embodiment, the first conduit protrusion 430 extends circumferentially around the entire outer surface 420. In some embodiments, however, the first conduit protrusion may extend for only a portion of the circumference of the outer surface. In some embodiments, two or more first conduit protrusions may extend around the circumference of the outer surface at the same axial distance away from the first end of the fluid conduit. The embodiment shown in FIG. 6 also shows a second conduit protrusion 435 extending radially from the outer surface 420 and located proximal to the first fluid conduit end 405. In this embodiment, the second conduit protrusion 435 extends around the outer surface 420. The depicted embodiment also includes axial slots 440 at the first fluid conduit end 405, and in this embodiment, the second conduit protrusion 435 is discontinuous at these axial slots 440. The second conduit protrusion may be configured in a variety of different ways similar to those described in connection with the first conduit protrusions. In addition, the second conduit protrusions may be located at other axial distances from the first fluid conduit end 405.

In some embodiments, including the embodiment shown in FIG. 6, the first and second conduit protrusions create a trough 450 in the outer surface 420 of the fluid conduit 400. This trough 450 may be configured to allow components or other features of the device to be located and potentially secured within the trough 450. In some embodiments, where either the first and/or the second conduit protrusion do not extend the entire circumference around the outer surface, the first and second conduit protrusions may be aligned axially to form a trough. In other embodiments, the fluid conduit may not include either a first or second conduit protrusion. These embodiments may include a notch extending radially inward from the outer surface. In these embodiments, the notch may similarly form a trough in the outer surface of the fluid conduit. The disclosure contemplates more or less conduit protrusions and/or troughs configured in various different manners.

The embodiment shown in FIG. 6 includes an axial slot 440. Some embodiments, however, may include a plurality of axial slots, and some embodiments may not include any axial slots. These axial slots 440 may allow the first fluid conduit end 405 of the fluid conduit 400 to vary in diameter. This may allow the fluid conduit 400 to engage and/or disengage with other fluid conduits. These axial slots may be configured in various different shapes or forms. In addition, some embodiments may vary the material at the first end of the fluid conduit to allow the diameter to change.

In the embodiment shown in FIG. 6, the gasket 300 engages with the fluid conduit 400 such that the tubular body 305 is engaged with at least a portion of the inner surface 415 of the fluid conduit 400. In this embodiment, the second tubular body end 340 of the tubular body 305 stops proximate the wall shelf 425 and, in particular, abuts the wall shelf 425. In some embodiments, the second tubular body end of the tubular body stops before the inner wall shelf. In the depicted embodiment, the first tubular body end 335 of the tubular body 305 extends past the first fluid conduit end 420 of the fluid conduit 400, and, in particular, the rim 310 extends past the first fluid conduit end 420 of the fluid conduit 400, extending from the inner surface 415 of the fluid conduit 400 to the outer surface 420 of the fluid conduit 400. In such a manner, the ears 315 extend from the rim 310 outside of the fluid conduit 400. In various embodiments, the ears 315 extend some distance from the rim 310, and in this embodiment, the ears 315 extend a distance such that they may engage the first conduit protrusions 435. In particular, the ears 315 of the depicted embodiment extend a first distance from the rim 310 that is greater than or equal to the axial distance the first conduit protrusion 435 is located from the first fluid conduit end 405. In the depicted embodiment, the rib 320 extends outwardly from the ear 315 at the distal end 345 of the ear 315.

Figure 7A:
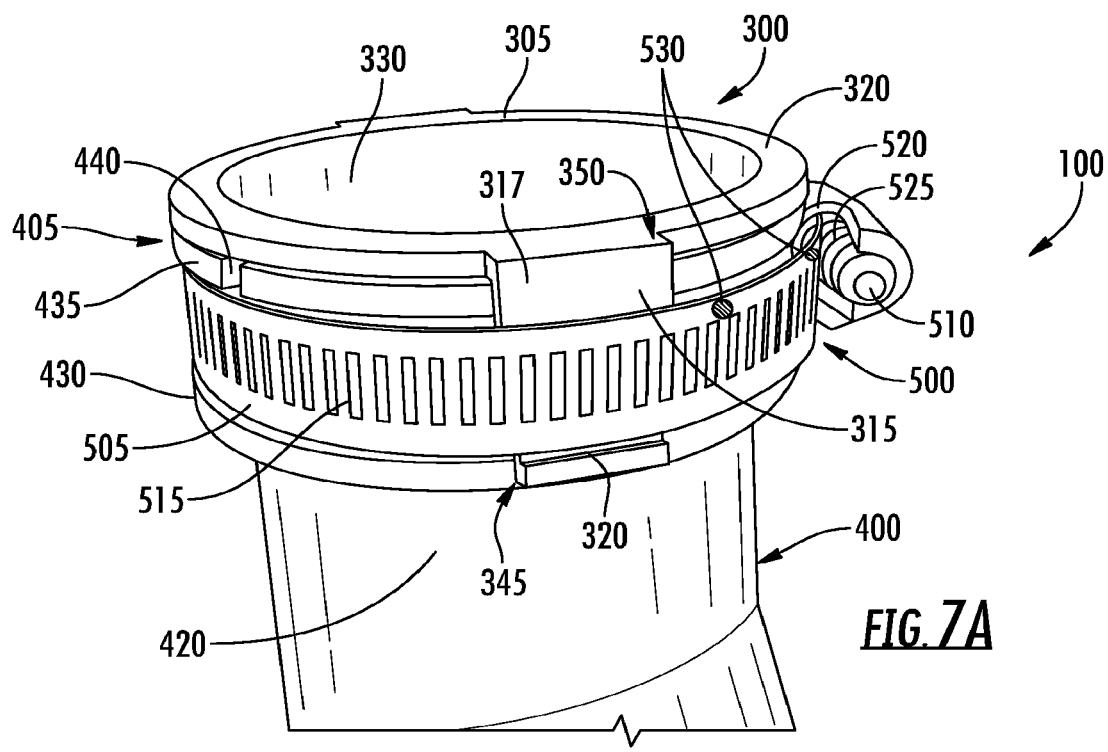
FIG. 7A is an illustration of a gasket within a fluid conduit with a pipe clamp, according to an example embodiment of the present disclosure.
Figure 7B:
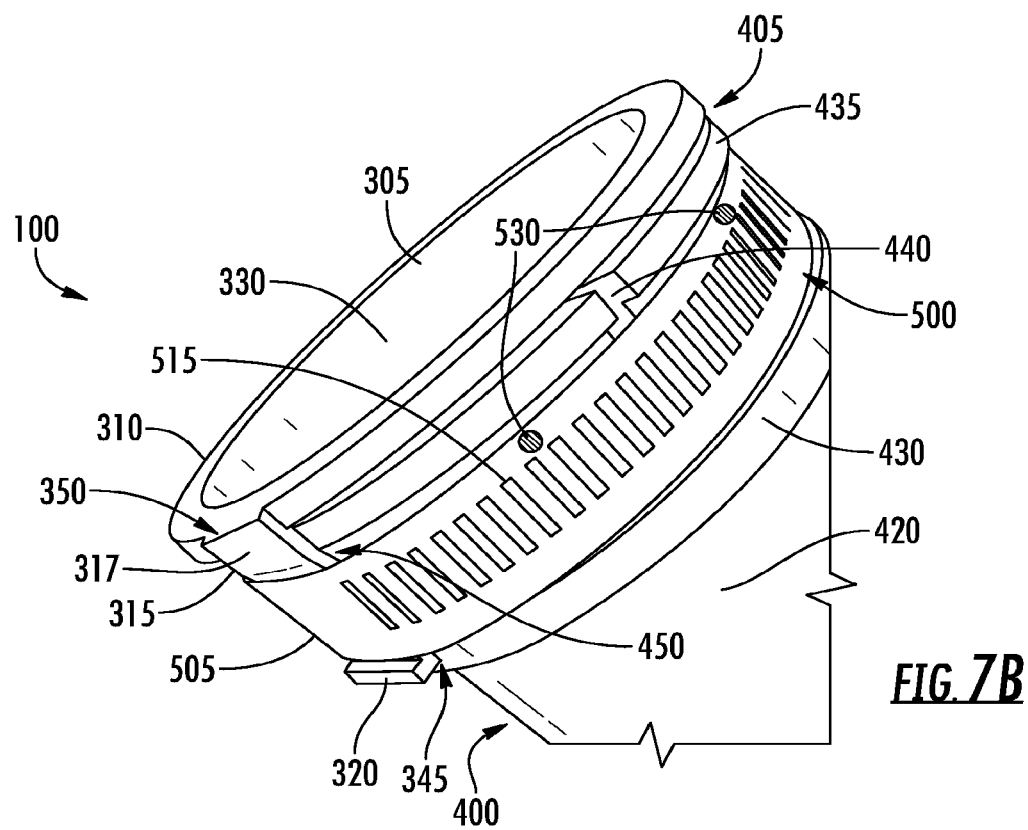
FIG. 7B is an illustration of a gasket within a fluid conduit with a pipe clamp from another angle, according to an example embodiment of the present disclosure.

FIGS. 7A and 7B show embodiments that includes a pipe clamp 500 engaged with an outer surface 317 of the gasket ears 315. In the depicted embodiments, the pipe clamp 500, which includes a clamp ring 505 and a clamp screw 510, secures the gasket 300 to the fluid conduit 400. The clamp ring 505 includes a plurality of ring apertures 515 that are configured to engage with threads 520 of the clamp screw 510. The pipe clamp 500 also includes a screw holder 525 that fixes the location of the clamp screw 510 relative to one end of the clamp ring 505. The screw holder 525 houses the clamp screw 510 at this location. In this embodiment, when the clamp screw 510 is turned (e.g., tightened or loosened) its location relative to the screw holder 525 remains constant, which also results a constant location of the screw relative to one end of the clamp ring 505. Turning the clamp screw 510 results in the screw threads 520 engaging the ring apertures 515, moving the opposite end of the clamp ring 505 in a given direction. This may result in the tightening or loosening of the clamp ring, which may in turn result in the clamp ring providing either a greater radial force when the clamp ring is tightened or a lesser radial force when the clamp ring is loosened. Other pipe clamps may be used within the scope of this disclosure such as zip ties or other devices.

In the embodiments shown in FIGS. 7A and 7B, the clamp ring 505 includes visual indicators 530 near certain ring apertures 515. In the depicted embodiments, the visual indicators 530 may indicate the radial force applied by the clamp ring 505 when the clamp screw 515 engages one or more ring apertures 515 at that location. In this embodiment, there are two visual indicators 530 each corresponding to a different radial force applied by the clamp ring 505 when the screw 510 engages the ring apertures 515 at the location of each visual indicator 530. In some embodiments, one of the visual indicators 530 corresponds to the radial force necessary to secure the gasket 300 to the fluid conduit 400. In some embodiments, one of the visual indicators 530 corresponds to radial force necessary to seal the fluid conduit 400 to another fluid conduit. In some embodiments, the radial force desired to seal one fluid conduit to another fluid conduit is greater than the radial force desired to retain the gasket on the fluid conduit. Visual indicators 530 may be any type of marking, such as colors and/or indicia, including, for example, drawings, symbols, text, numbers, etc., to indicate radial force associated with a particular setting of the pipe clamp.

FIGS. 7A and 7B, further show example embodiments of the pipe clamp 500 engaged with the gasket 300 and the fluid conduit 400. In the depicted embodiments, the pipe clamp 500 engages with the outer surface 317 of each of the gasket ears 315. In particular, the pipe clamp ring 505 engages with the outer surface 317 of the gasket ear 315 above the rib 320, which may retain the pipe clamp 500 (and the gasket 300) in the axial direction. The clamp ring 505 is also located between the first and second conduit protrusions (430 & 435), and at this radial force it is located at least partially within the trough 450 defined between these conduit protrusions. This configuration helps to secure the pipe clamp 500 axially on the fluid conduit 400, and because the pipe clamp 500 is also engaged with the gasket 300, the gasket 300 is also secured axially relative to the fluid conduit 400. The embodiment shown in FIG. 7B illustrates the gasket ear 315 slightly bowing due to the radial force applied by the pipe clamp 505. This bowing or deformation may further secure the gasket 300 relative to the fluid conduit 400.

Figure 8A:
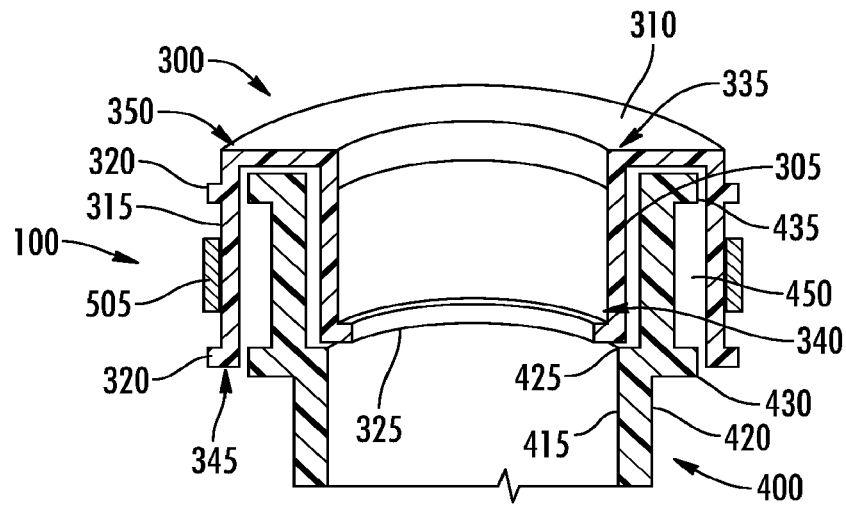
FIG. 8A is a section view of a sealing assembly, according to an example embodiment of the present disclosure.
Figure 8B:
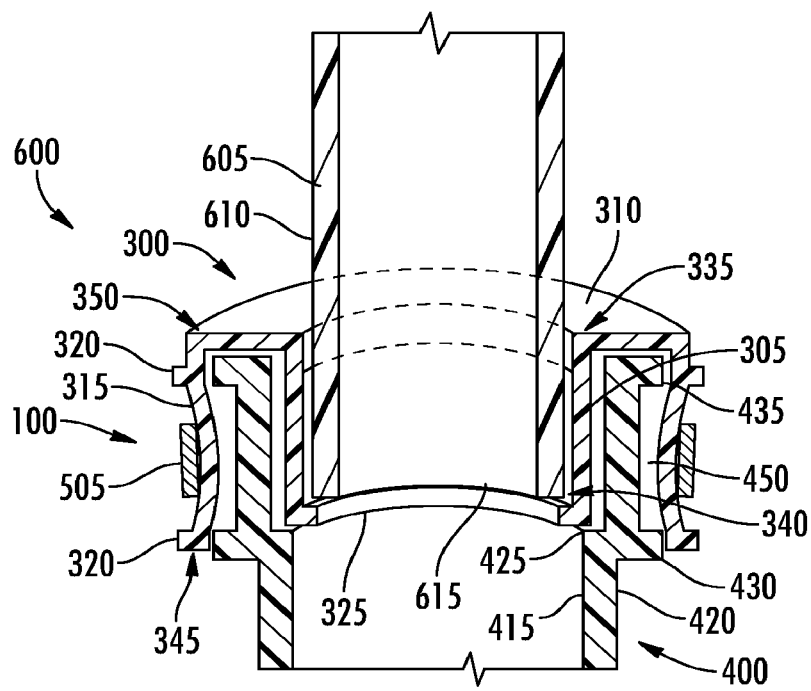
FIG. 8B is a section view of a joint with a sealing assembly, according to an example embodiment of the present disclosure.

FIGS. 8A and 8B show example embodiments of the sealing assembly. These illustrations show cross-sections of this sealing assembly 100 and a sealed joint 600. FIG. 8A shows an embodiment where the pipe clamp 500 is at a given radial force that may be sufficient to secure the gasket 300 in an uninstalled configuration. In this embodiment, the gasket ears 315 are substantially straight because the radial force is not sufficient to cause the gasket ears 315 to deform or bow. FIG. 8B shows an embodiment where the pipe clamp 500 applies a greater radial force, potentially to seal a joint. In this embodiment the greater radial force leads to the gasket ears 315 bowing into the trough 450 between the first and second conduit protrusions (430 & 435).

In the embodiment depicted in FIG. 8B, the gasket 300 provides a seal between several of the surfaces associated with the fluid conduit 400 and a connected conduit 605. In some embodiments the sealed joint shown in FIGS. 1 and 2 between the exhaust conduit 210 and the flue pipe 215 is the same or similar to the joint shown in FIG. 8B where the exhaust conduit 210 is analogous to the fluid conduit 400 and the connected conduit 605 is analogous to the flue pipe 215. In the embodiments depicted in FIGS. 8A and 8B, the tubular body 305 of the gasket 300 is located within the inner surface 415 of the fluid conduit 400 engaging at least a portion of that surface. The tubular body 305 also may engage at least a portion of an outer surface 610 of the connected conduit 605 as shown in FIG. 8B. In the embodiment depicted in FIG. 8B, the tubular body 305 may form a seal between the inner surface 415 of the fluid conduit 400 and the outer surface 610 of the connected conduit 605. In some embodiments, this seal is formed when the pipe clamp 500 applies an appropriate amount of radial force.

In the depicted embodiments, a second tubular body end 340 of the tubular body 305 abuts the wall shelf 425 of the fluid conduit, engaging the fluid conduit 400 at that location as well. In the depicted embodiments, the second tubular body end 340 also includes an inner lip 325 extending inwardly. In the embodiment shown in FIG. 8B, this inner lip 325 engages one end 615 of the connected conduit 605. This allows the gasket 300 to engage the fluid conduit 400 and the connected conduit 605 at additional locations, potentially providing a greater seal.

In the depicted embodiments, the gasket 300 also includes features allowing it to engage with the pipe clamp 500 and remain secured to the fluid conduit 400 regardless of whether the joint is sealed or not. In the depicted embodiments, the gasket ears 315 include two ribs 320. Other embodiments may only include one rib (or another number of ribs) and may operate similarly. In the depicted embodiments, the pipe clamp 500 engages each ear 315 between the two ribs 320. As shown in both FIGS. 8A and 8B, the gasket 300 of the depicted the embodiments is sized such that when the pipe clamp 500 engages the ears 315, the pipe clamp is located between the first and second protrusions (430 and 435). In this configuration, as shown in FIGS. 7A and 7B the pipe clamp 500 may engage the trough 450 between the first and second protrusions (430 and 435) in areas of the trough not occupied by the gasket ears 315 even if the gasket ears 315 are not deformed. In addition, when the pipe clamp 500 increases the amount of radial force applied, it may deform the gasket ears 315 causing them to bow within the trough 450 as shown in FIG. 8B, which may further secure the various components. In addition, as the pipe clamp 500 applies greater radial force it may secure and seal the fluid conduit 400 to the connecting member 605.

Figure 9:
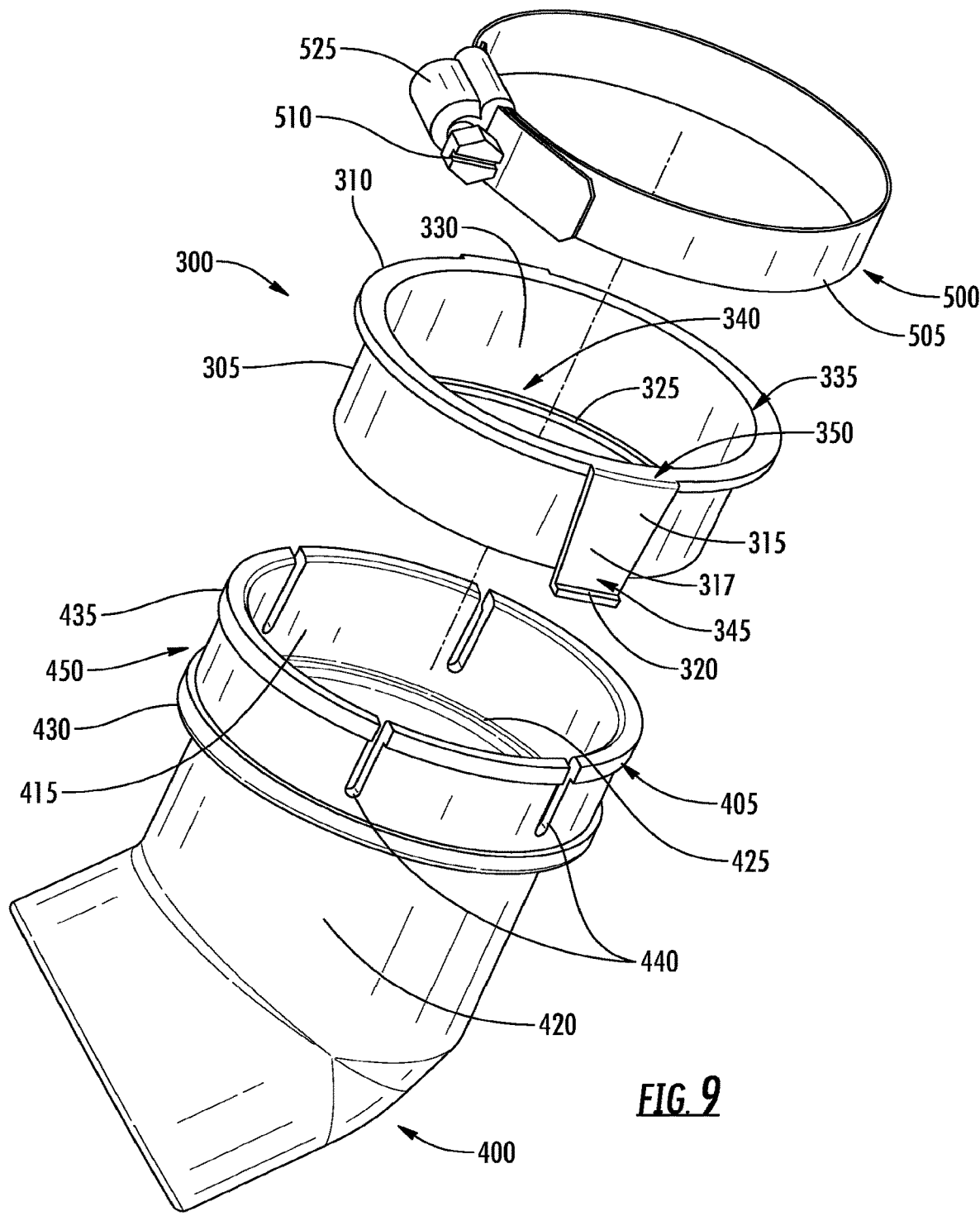
FIG. 9 is an exploded illustration of a fluid conduit, a gasket, and a pipe clamp, according to an example embodiment of the present disclosure.
Figure 10A:
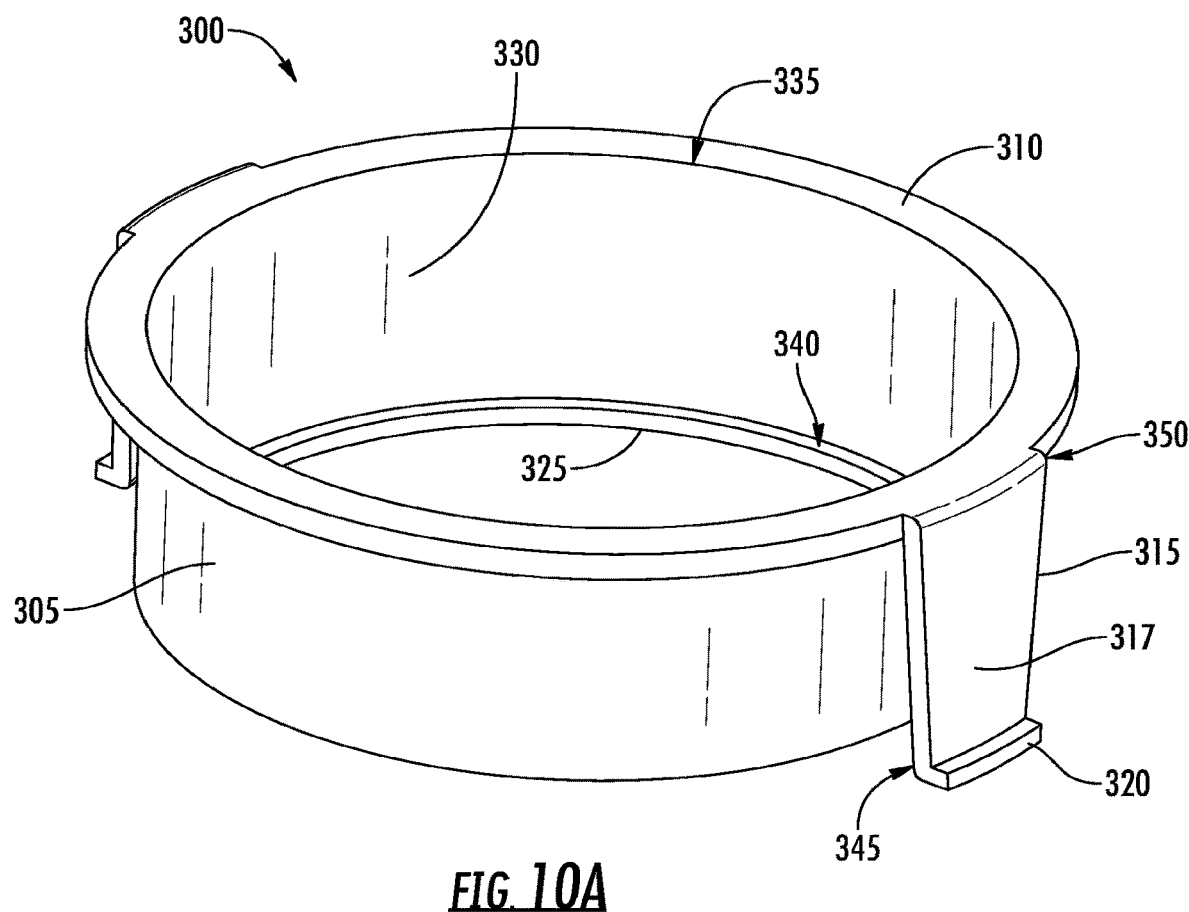
FIG. 10A is an is an angled view of a gasket, according to an example embodiment of the present disclosure.
Figure 10B:
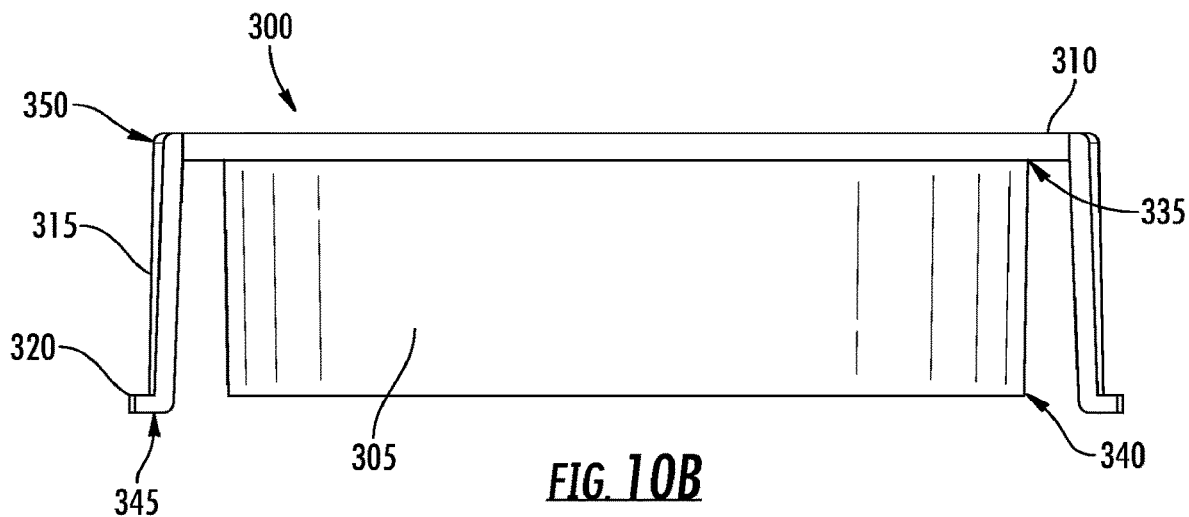
FIG. 10B is a front view of a gasket, according to an example embodiment of the present disclosure.
Figure 10C:
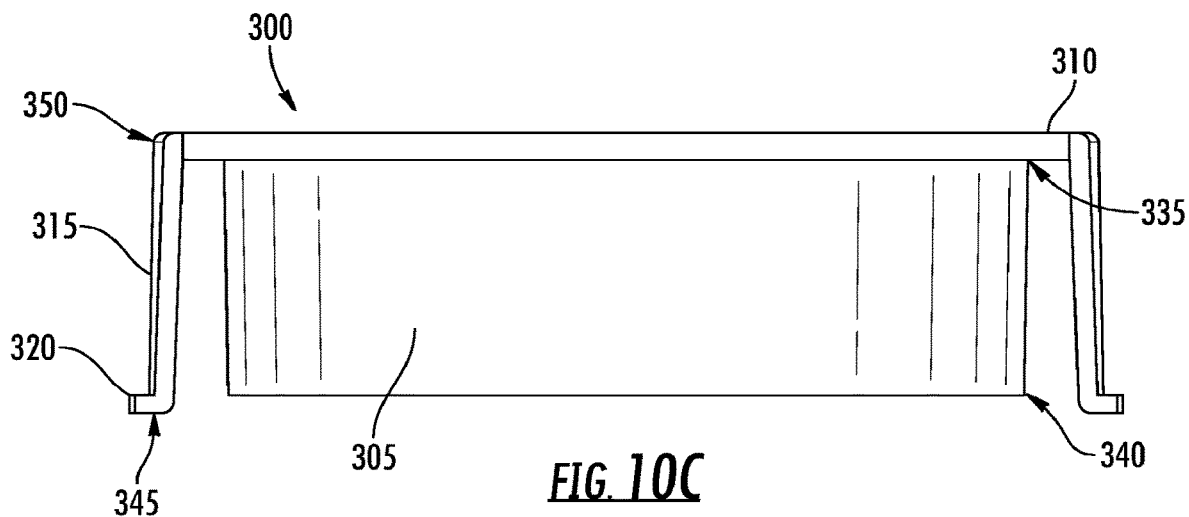
FIG. 10C is a rear view of a gasket, according to an example embodiment of the present disclosure.
Figure 10D:
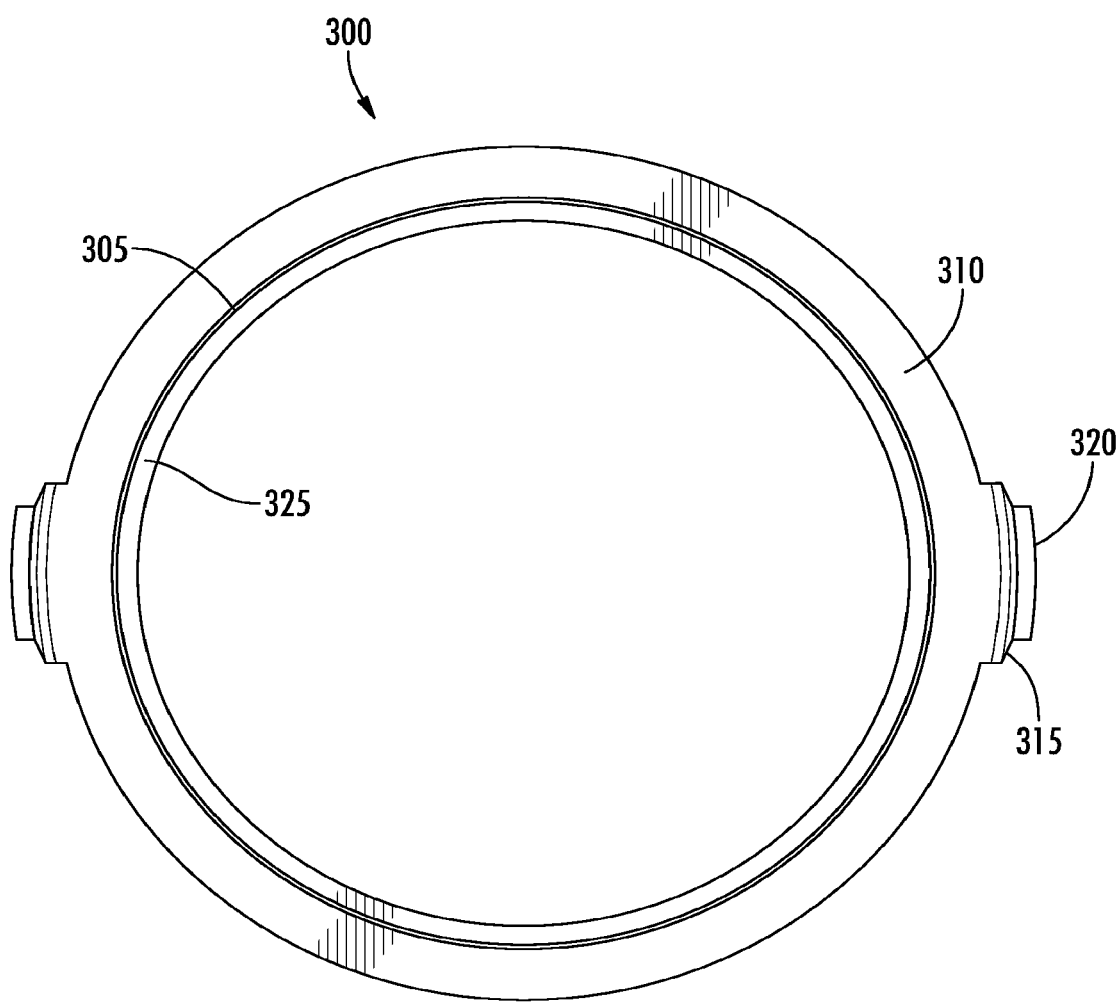
FIG. 10D is a top view of a gasket, according to an example embodiment of the present disclosure.
Figure 10E:
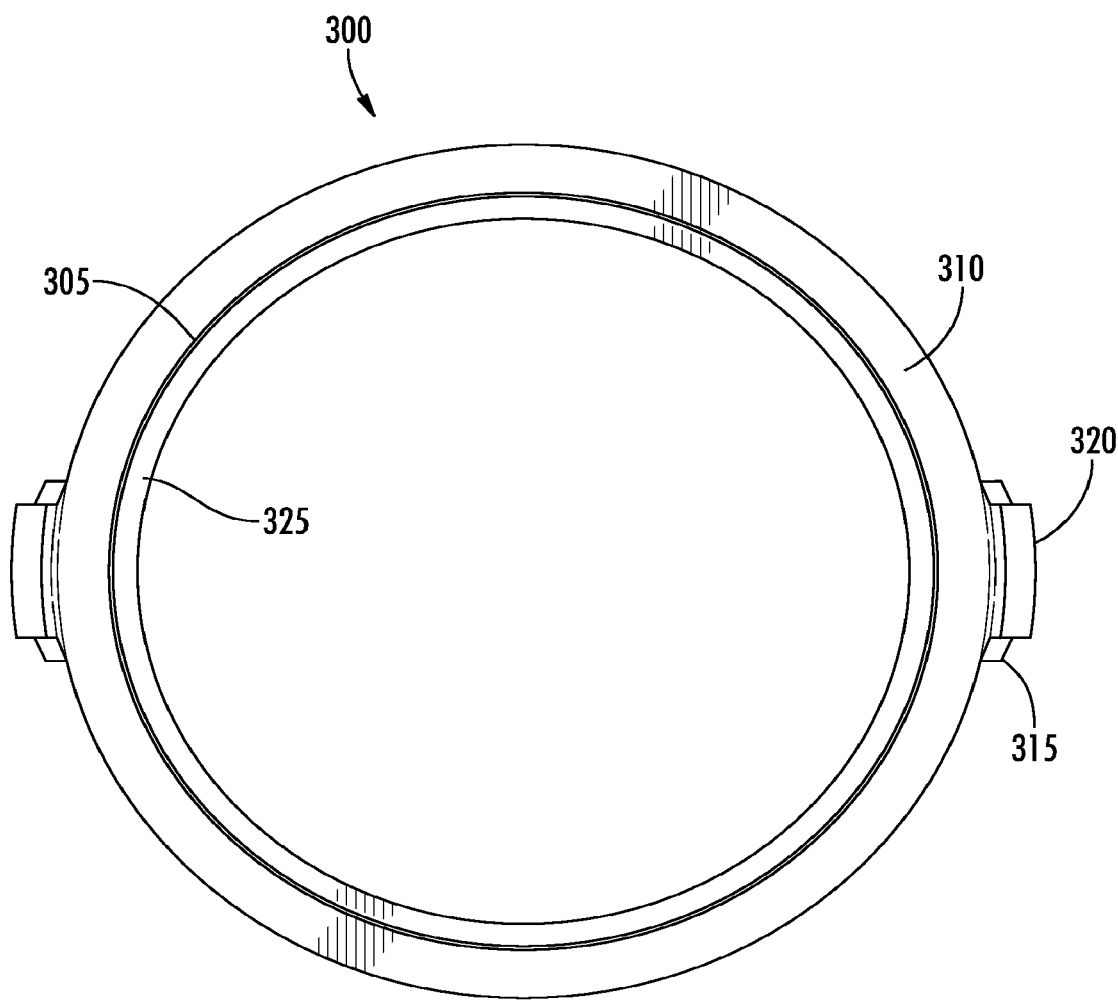
FIG. 10E is a bottom view of a gasket, according to an example embodiment of the present disclosure.
Figure 10F:
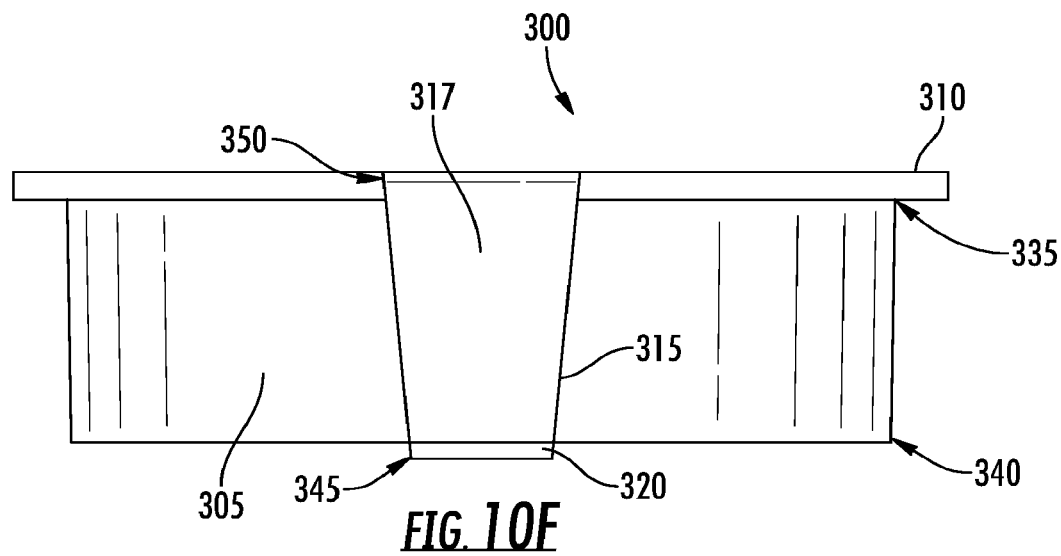
FIG. 10F is a left side view of a gasket, according to an example embodiment of the present disclosure.
Figure 10G:
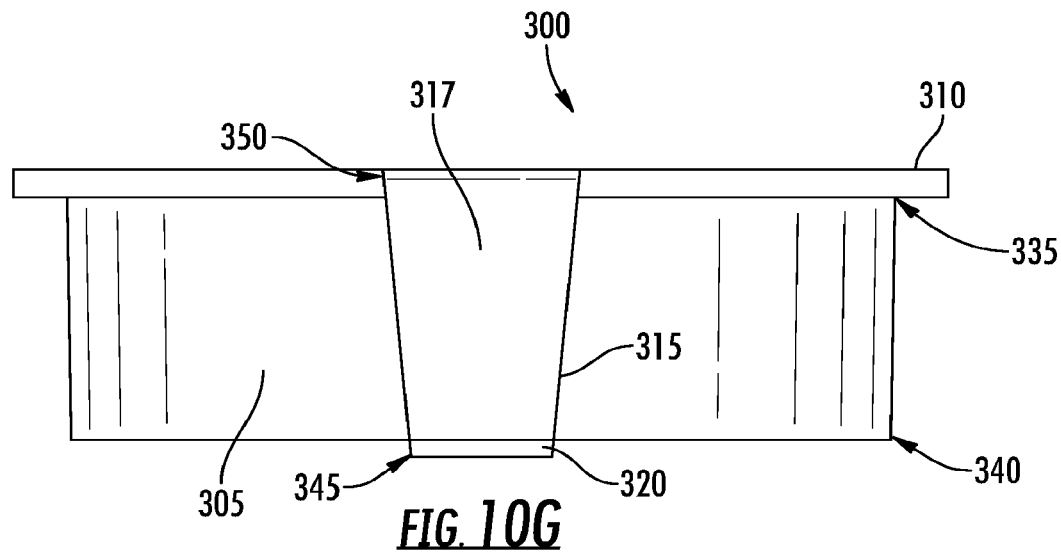
FIG. 10G is a right side view of a gasket, according to an example embodiment of the present disclosure.
Figure 11A:
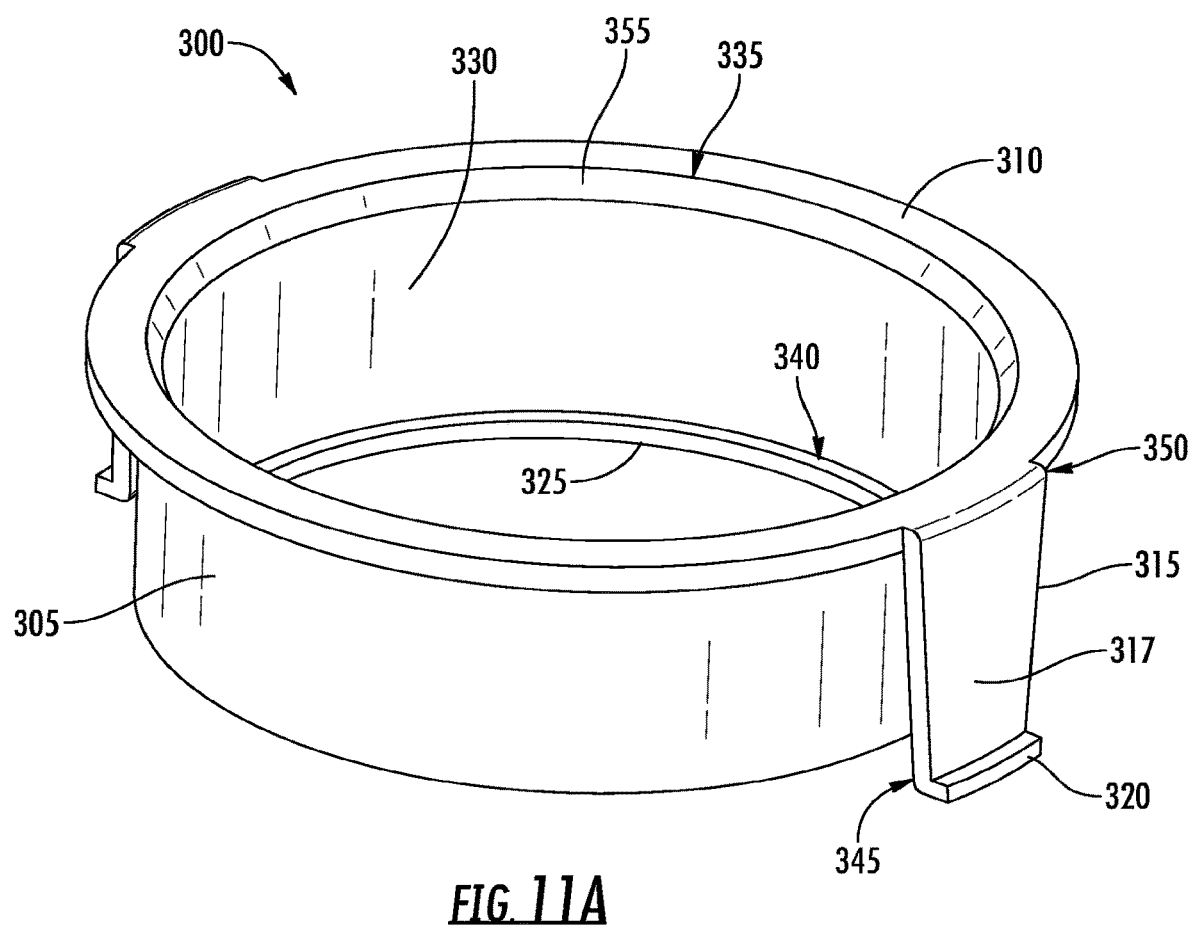
FIG. 11A is an is an angled view of a gasket, according to an example embodiment of the present disclosure.
Figure 11B:
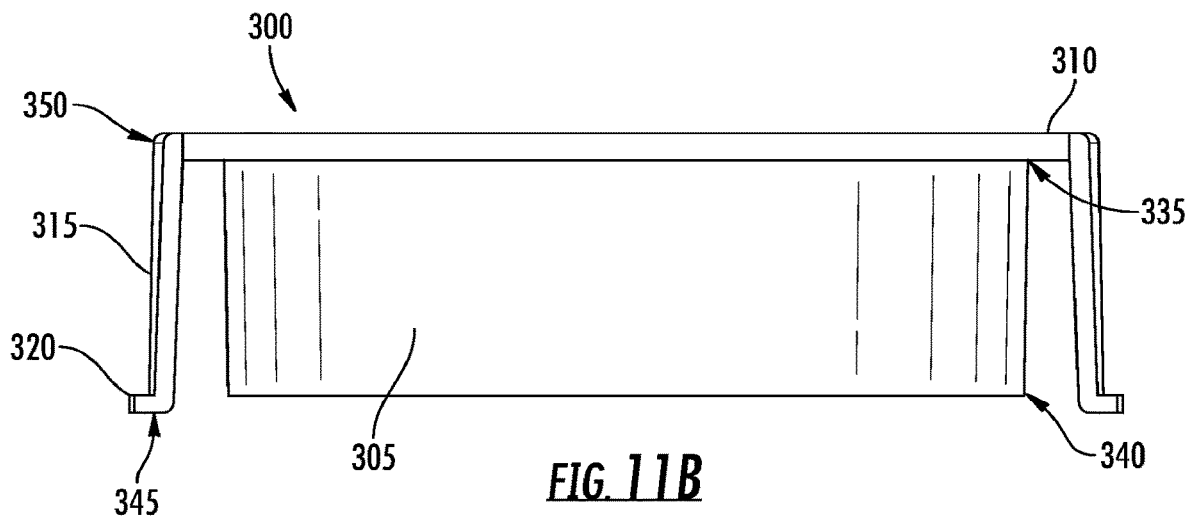
FIG. 11B is a front view of a gasket, according to an example embodiment of the present disclosure.
Figure 11C:
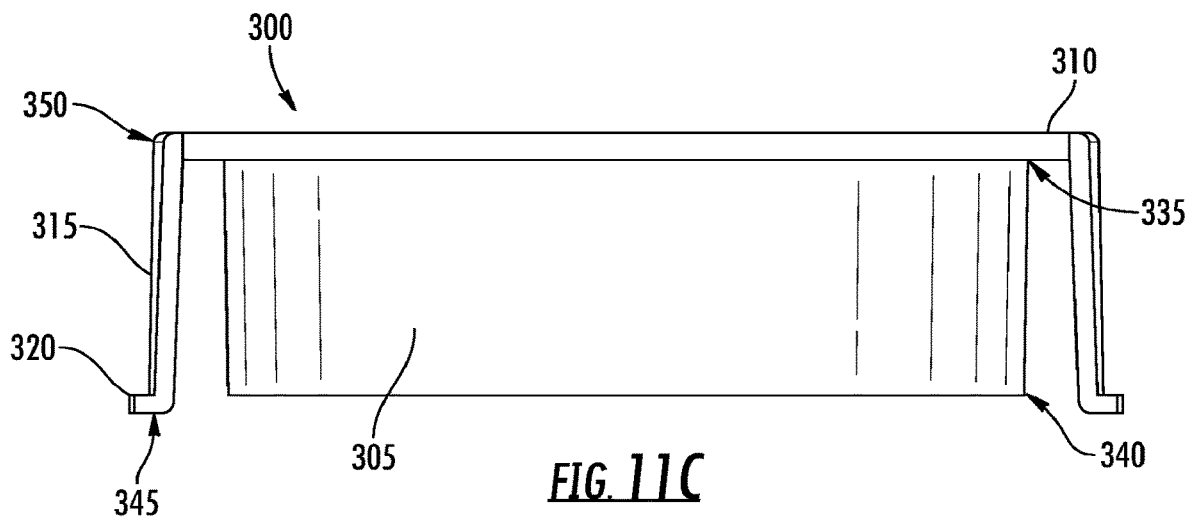
FIG. 11C is a rear view of a gasket, according to an example embodiment of the present disclosure.
Figure 11D:
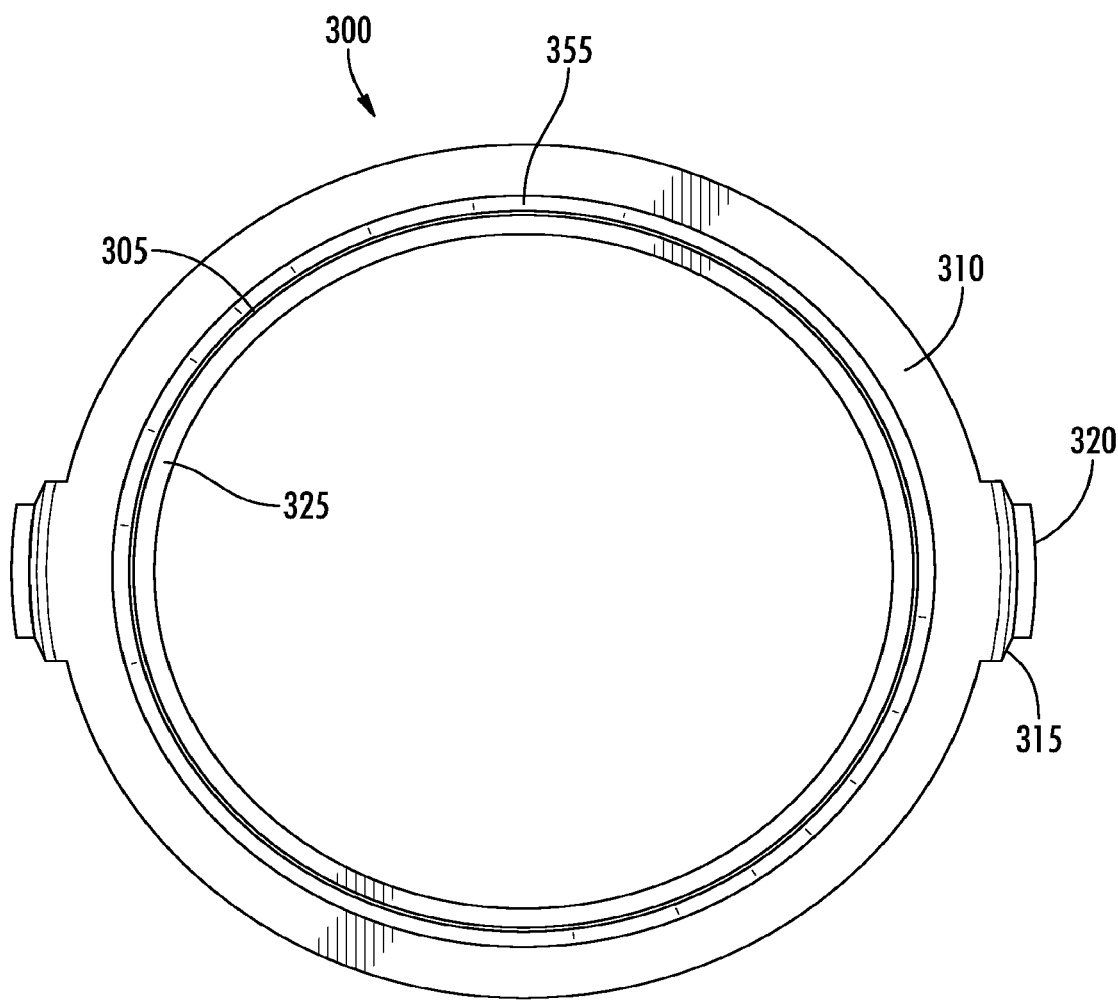
FIG. 11D is a top view of a gasket, according to an example embodiment of the present disclosure.
Figure 11E:
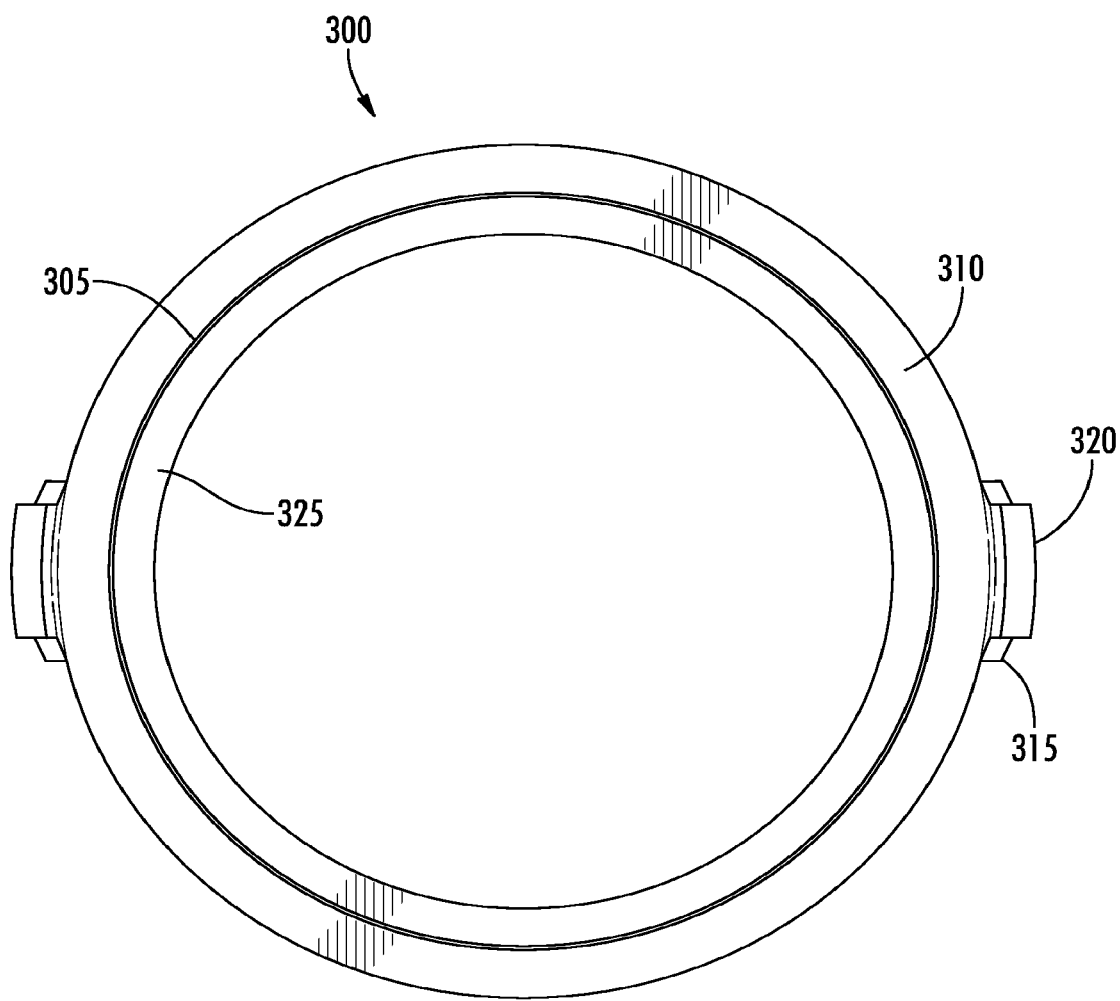
FIG. 11E is a bottom view of a gasket, according to an example embodiment of the present disclosure.
Figure 11F:
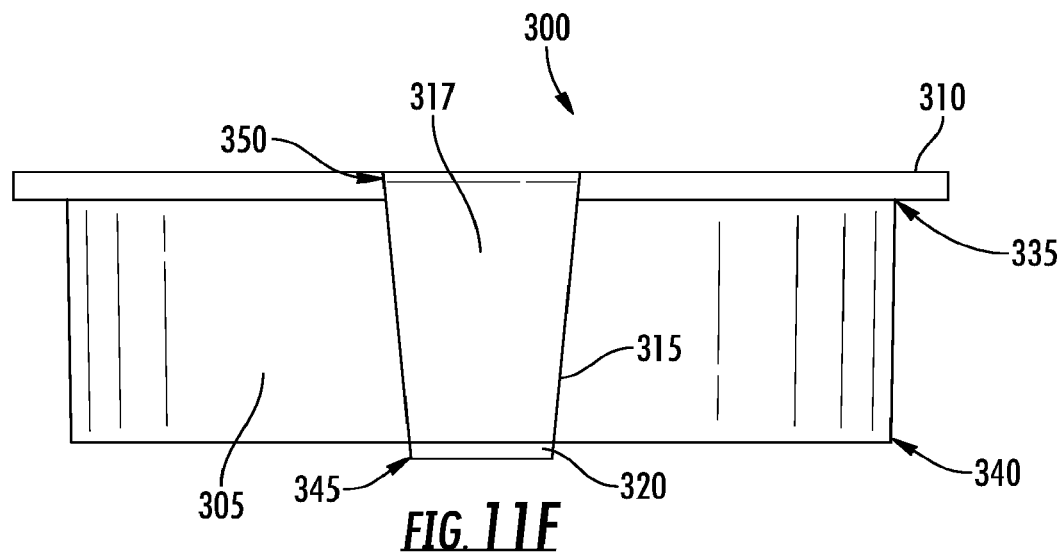
FIG. 11F is a left side view of a gasket, according to an example embodiment of the present disclosure.
Figure 11G:
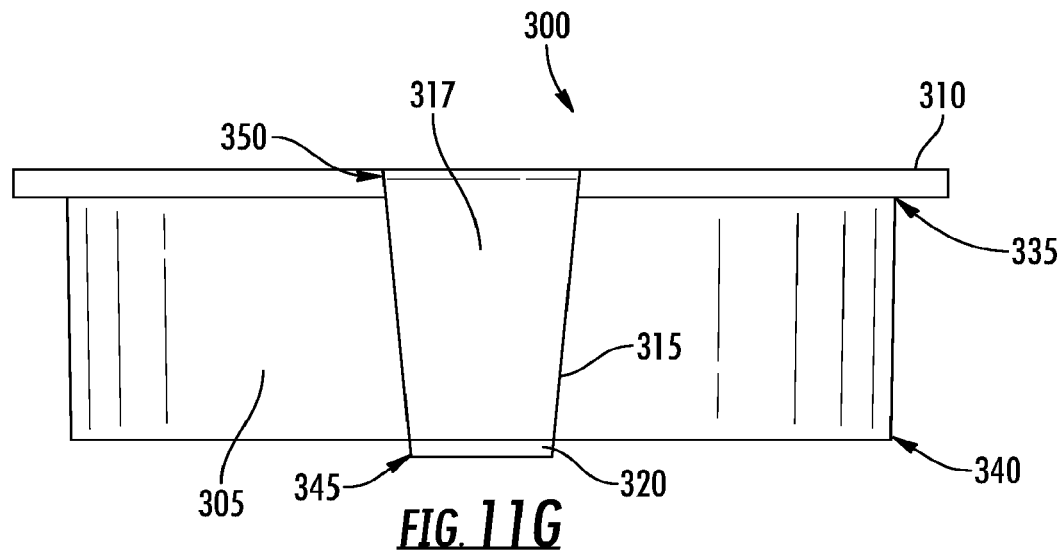
FIG. 11G is a right side view of a gasket, according to an example embodiment of the present disclosure.

The sealing assemblies discussed herein can be used in multiple different devices and for various purposes. In some embodiments, as discussed herein, the sealing assemblies are used in a furnace, and in these embodiments, the sealing assemblies may allow for an improved process for testing and shipping the furnaces. For example, in some embodiments, a furnace utilizing one or more of the disclosed sealing assemblies is shipped to one or more locations prior to final installation. This shipping may allow for the furnace and/or furnace components to be tested prior to final installation. In some embodiments, the exhaust assembly in the furnace is tested. In some embodiments, this testing includes coupling and uncoupling the exhaust assembly to a discharge conduit for use during this testing, and in some embodiments, this coupling and uncoupling is performed via the sealing assembly. In some embodiments, during testing the sealing assembly is coupled and uncoupled to the discharge conduit multiple times. In some embodiments, the sealing assembly is coupled and uncoupled once during testing. In some embodiments, after testing is completed, the furnace is shipped to a different location, potentially for installation, storage, or another purpose. In some embodiments, various components of the furnace are removed after testing, potentially for shipping convenience. In some embodiments, this includes removing one or more of the sealing assemblies and shipping the sealing assemblies in a disconnected configuration. FIG. 9 shows an example illustration of an exploded view of the components used in the sealing assembly and described above, showing the fluid conduit, the gasket, and the pipe clamp in an exploded view.

In some embodiments, the process of testing and/or shipping impacts the components of the sealing assembly. In some embodiments, these processes create forces that could dislodge the gasket from the end of the fluid conduit and/or the sealing assembly as a whole. For example, in some embodiments, the forces occur during testing when a pipe (e.g., a discharge pipe, a flue pipe, etc.) is inserted into the assembly, which may result in a force directing the gasket into the fluid conduit within the sealing assembly. In addition, in some embodiments, when the pipe is removed from the sealing assembly a force may direct the gasket out of the fluid conduit. In some embodiments, during shipping, multiple forces impact the sealing assembly and create forces that could lead to the gasket being dislodged from the end of the fluid conduit and/or the sealing assembly.

In the various embodiments discussed herein, the sealing assembly includes features that secure the gasket, including securing the gasket through the various shipping and testing processes discussed above. For example, as discussed above in some embodiments, the pipe clamp engages with the gasket ears to secure the gasket to the fluid conduit. The pipe clamp may secure the gasket through radial force applied to the gasket ears, which in some embodiments counteracts the various forces that could dislodge the gasket from the end of the fluid conduit. In addition, in some embodiments, the pipe clamp may engage with the conduit protrusion(s) and/or a trough formed on an outer surface of the fluid conduit, which may further secure the components of the sealing assembly together. In some embodiments, the radial force of the pipe clamp may cause the gasket ears to also engage with the conduit protrusion(s) and/or a trough formed on an outer surface of the fluid conduit, which may further secure the components of the sealing assembly together. The radial force applied by the pipe clamp may also be adjusted in some embodiments, and as a result, the pipe clamp may be adjusted to account for the process or action the furnace undergoes, e.g., shipping, testing, operating, etc., and how that process or action may impact the sealing assembly.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A sealing apparatus, comprising:
   a fluid conduit comprising a fluid conduit end; and
   a gasket engaged with the fluid conduit end, the gasket comprising:
   a tubular body, at least a portion of which is engaged along an inner surface of the fluid conduit;
   a rim extending outwardly from a first tubular body end, wherein a portion of the rim abuts the fluid conduit end; and two or more ears attaching to and extending directly from the rim, the ears including an inner surface and an outer surface, the outer surface configured to directly engage and contact with a surface of a pipe clamp;

wherein each of the ears comprises a first rib extending from the outer surface and located proximate a distal end of the ear, wherein a width of the first rib is equal to or less than another width of the ear located proximate the distal end of the ear.

2. The apparatus of claim 1, wherein the fluid conduit is configured to be used in a furnace.

3. The apparatus of claim 1, wherein the fluid conduit is an outlet for a combustion blower.

4. The apparatus of claim 1, wherein each of the ears further comprises the first rib and a second rib, the second rib extending from the outer surface and located a distance away from the distal end.

5. The apparatus of claim 1, wherein the two or more ears comprises a deformable elastic material.

6. The apparatus of claim 5, wherein the rim extends substantially perpendicularly outwardly from the tubular body, and the ears are configured to deform such that the ears extend substantially perpendicularly from the rim and substantially parallel to the tubular body, and the first rib of each ear extends substantially perpendicularly outwardly from the ear.

7. The apparatus of claim 1, wherein the tubular body comprises an inner lip extending inwardly from a second tubular body end of the tubular body.

8. The apparatus of claim 1, further comprising a pipe clamp, the pipe clamp engaged with the outer surface of the ears to secure the gasket to the fluid conduit.

9. A combustion blower assembly, comprising:
a blower configured to move combustion air through a heat exchanger, the blower including an outlet;
a fluid conduit coupled to and in fluid communication with the outlet of the blower; and
a sealing apparatus for coupling the outlet of the blower to the fluid conduit, the sealing apparatus includes:
a gasket engaged with at least one of the outlet of the blower and an end of the fluid conduit, the gasket comprising:
a tubular body, at least a portion of which is engaged along an inner surface of the at least one of the outlet of the blower and the fluid conduit;
a rim extending outwardly from a first tubular body end, wherein a portion of the rim abuts an end of the at least one of the outlet of the blower and the end of the fluid conduit; and two or more ears extending from the rim, the ears including an inner surface and an outer surface, the outer surface configured to engage with a pipe clamp, wherein each of the ears comprises a first rib extending from the outer surface and located proximate a distal end of the ear.

10. The combustion blower assembly of claim 9, wherein an inner surface of the tubular body comprises an inner lip extending inwardly from a second tubular body end of the tubular body.

11. The combustion blower assembly of claim 9, wherein each of the ears further comprises the first rib and a second rib, the second rib extending from the outer surface and located a distance away from the distal end.

12. The combustion blower assembly of claim 9, wherein the rim extends substantially perpendicularly outwardly from the tubular body, and the ears extend substantially perpendicularly from the rim and substantially parallel to the tubular body, and the first rib of each ear extends substantially perpendicularly outwardly from the ear.

13. The combustion blower assembly of claim 9, wherein the ears extend substantially the same distance from the rim as the tubular body.

14. The combustion blower assembly of claim 9, wherein the ears are tapered such that a width of each ear continuously narrows from the rim to the distal end of the ear.

15. The combustion blower assembly of claim 9, further comprises a pipe clamp, the pipe clamp applies a force to maintain a seal between the outlet of the blower and the fluid conduit.

16. The combustion blower assembly of claim 9, wherein the gasket is engaged with the outlet of the blower.

17. The combustion blower assembly of claim 16, wherein the outlet of the blower further comprises:
a first conduit protrusion extending from an outer surface of the outlet of the blower, wherein the first conduit protrusion is located a first distance from the end of the outlet of the blower, and
wherein the ears extend a second distance from the rim and the second distance is equal to or greater than the first distance, and wherein at least one ear is engaged with the first conduit protrusion.

18. The combustion blower assembly of claim 17, wherein the first conduit protrusion extends circumferentially around the outer surface of the outlet of the blower.

19. The combustion blower assembly of claim 17, further comprising a second conduit protrusion extending from the outer surface of the outlet of the blower and aligned axially with the first conduit protrusion.

* * * * *

UNITED STATES PATENT AND TRADEMARK OFFICE
CERTIFICATE OF CORRECTION

| | | |
|---|---|---|
| PATENT NO. | : 11,879,574 B1 | Page 1 of 1 |
| APPLICATION NO. | : 18/053708 | |
| DATED | : January 23, 2024 | |
| INVENTOR(S) | : Gary L. Shultz, Jr. et al. | |

It is certified that error appears in the above-identified patent and that said Letters Patent is hereby corrected as shown below:

On the Title Page

In item (12) "Schultz, Jr. et al." should be changed to --Shultz, Jr. et al.--.

In item (72) Inventors, "Gary L. Schultz, Jr." should be changed to --Gary L. Shultz, Jr.--.

Signed and Sealed this
First Day of October, 2024

*Katherine Kelly Vidal*

Katherine Kelly Vidal
*Director of the United States Patent and Trademark Office*